United States Patent [19]

Skarvan

[11] Patent Number: 5,373,897
[45] Date of Patent: Dec. 20, 1994

[54] UNDERGROUND FLUID RECOVERY DEVICE

[76] Inventor: Richard Skarvan, 17626 Henry St., Lansing, Ill. 60438

[21] Appl. No.: 55,973

[22] Filed: Apr. 29, 1993

[51] Int. Cl.$^5$ ............................................. E21B 43/00
[52] U.S. Cl. ...................................... 166/53; 166/250
[58] Field of Search ................ 166/53, 68, 68.5, 369, 166/370

[56] References Cited

U.S. PATENT DOCUMENTS

| | | | |
|---|---|---|---|
| 4,489,779 | 12/1984 | Dickinson et al. | |
| 4,527,633 | 7/1985 | McLaughlin et al. | |
| 4,625,801 | 12/1986 | McLaughlin et al. | |
| 4,630,677 | 12/1986 | Jakob | |
| 4,666,375 | 5/1987 | Kime | 166/53 X |
| 4,678,040 | 7/1987 | McLaughlin et al. | |
| 4,727,936 | 3/1988 | Mioduszewski et al. | |
| 4,791,990 | 12/1988 | Amani | 166/53 X |
| 4,826,406 | 5/1989 | Wells | |
| 4,844,797 | 7/1989 | Wells | |
| 5,027,902 | 7/1991 | Dickinson et al. | |
| 5,045,215 | 9/1991 | Lamarre | |
| 5,099,920 | 3/1992 | Warburton et al. | 166/250 |
| 5,132,904 | 7/1992 | Lamp | 166/53 X |
| 5,146,991 | 9/1992 | Rogers, Jr. | 166/369 |

Primary Examiner—Michael Powell Buiz
Attorney, Agent, or Firm—Dennis C. Skarvan

[57] ABSTRACT

A pneumatic underground fluid recovery pump is disclosed that includes a power actuated inlet valve and a power source, independent of the static fluid pressure head in the well, for actuating the power actuated inlet valve between open and closed positions. Also disclosed is a pneumatic underground fluid recovery pump that includes a fluid level sensor for sensing fluid level in the pump reservoir above a first predetermined level and a controller for controlling the pressurization of the pump in response to the fluid level sensor sensing fluid level above the first predetermined level. Also disclosed is a pneumatic underground fluid recovery pump that includes a fluid level tracking device for sensing underground fluid level in the well and adjusting the level of the pump inlet valve a predetermined distance below the underground fluid level in the well.

30 Claims, 21 Drawing Sheets

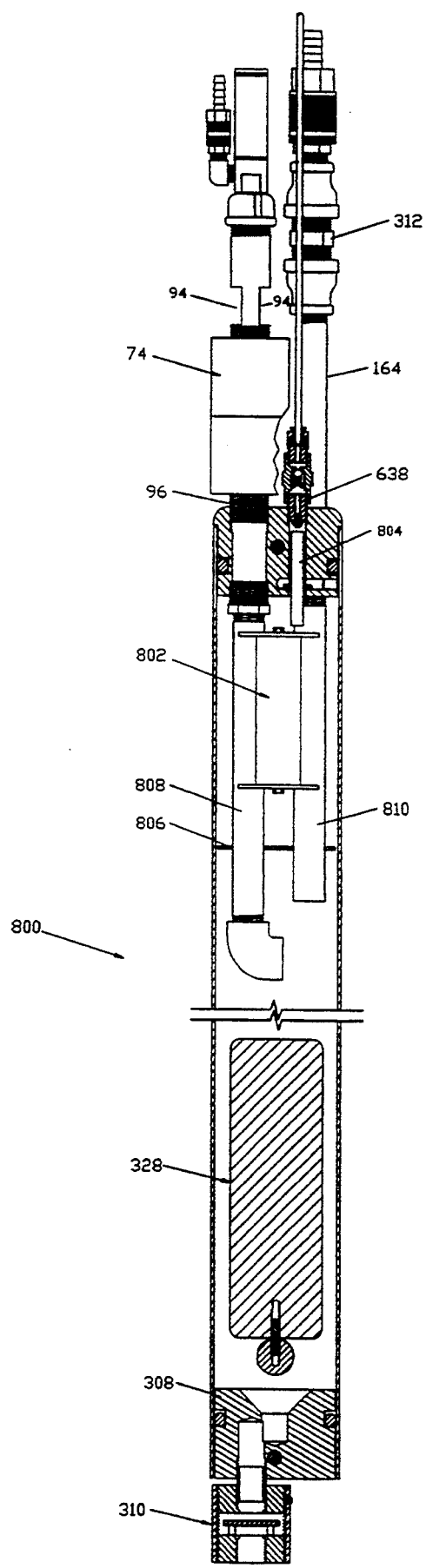
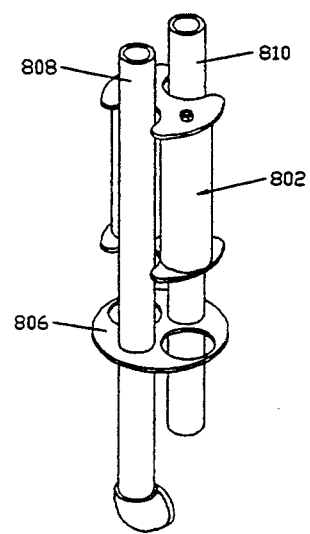
FIG. 15B
FIG. 15A

UNDERGROUND FLUID RECOVERY DEVICE

BACKGROUND OF THE INVENTION

This invention relates generally to fluid pumps and more specifically to a pneumatic underground fluid recovery device for use in a well to pump underground fluids therefrom.

Increasing public awareness and concern over the widespread contamination of the world's aquifers has caused legislation to be promulgated mandating reduced contamination levels of ground water. The range of contaminants regulated include gasoline, diesel, and fuel oils as well as coal tar, creosote and a multitude of other organic and inorganic compounds. Additionally, landfill leachates have been regulated to prevent the contamination of surrounding aquifers.

As a result, various pumping systems have been developed in an attempt to remove hazardous chemicals and the like from groundwater. Typically, the central component of these systems includes an underground pump installed in a remediation well approximately at the water table for extracting either the free-phase floating or sinking contaminants, the contaminated groundwater, or some combination thereof from the well. The underground pump is either pneumatically or electrically powered depending on the particular installation. For example, electrically powered pumps are more efficient and more economical to operate than pneumatic pumps in large multiple pump installations, while pneumatic pumps generally require less safety equipment and associated expense for installations having potentially explosive vapors and gases. Pneumatic pumps offer the additional advantage of pumping underground fluids with a minimum of turbulence and mixing. As a result, subsequent gravity separation is more simply accomplished over that associated with electrically powered pumps, which tend to break free-phase hydrocarbons into extremely small droplets and/or emulsify the pumped underground fluid.

Regardless of the type of power chosen, the pump must further withstand the wet and typically corrosive environment encountered in and around remediation wells. For example, in prior known pneumatic pump systems, such as those disclosed in U.S. Pat. Nos. 4,527,633, 4,489,779, 4,826,406 and 5,027,902 to McLaughlin et. al, liquid is admitted to the pump vessel through a static pressure responsive check valve which is prone to fouling or otherwise clogging from biological growths and mineral deposits, thereby degrading the performance of, or even worse, disabling the pump. This is especially true for top filling pumps in which only the force of the head of liquid above the pump, in many instances less than one inch of water column, is available to unseat the flapper sealing element of the check valve. Further aggravating this problem is the small porting required of the top filling static pressure responsive check valve so that the valve opens or "cracks" at the low pressures. Inlet screens have been employed in an attempt to reduce the fouling; however, these too have been found to quickly clog from biological growths and mineral deposits, thereby disabling the pump. Therefore, a need exists for an underground fluid recovery device that is less susceptible to fouling.

Preferably, the pump should be able to compensate and adjust for static fluid level variations in the remediation well. For example, to skim free-phase floating or sinking contaminants from an aquifer, the pump is desirably positioned so that its inlet is located very near the contaminant/water interface. Unfortunately, static well level rarely remains constant for very long periods of time due to the effects of rain, tides, pumping from nearby wells and/or other hydrogeologic events. Static well level changes of only a few inches can render a pump ineffective.

In U.S. Pat. No. 4,678,040 to McLaughlin, the pump compensates for static fluid level variations in the well by adjusting the inlet of the pump relative to the pump via an external float. However, the size of the float is limited by the diameter of the remediation well. For remediation wells four inches in diameter or less, a small float must be used, limiting the available buoyancy force to only a few ounces and a range of travel less than two feet. Even under optimal conditions, this range of travel is not adequate for many installation sites, especially those, for example, near coastlines where tidal fluctuations alone may be three feet or more. Further, similar to the static pressure responsive inlet valve, the external float is susceptible to the accumulation of biological and mineral deposits that change the specific gravity of the float, increase the stiffness of the coiled tube connecting the float to the collection vessel and/or close off the clearance area between the float and its guide rod—all of which, alone or in combination, can quickly disable the float and render the pump ineffective. Therefore, a need exists for an underground fluid recovery device that compensates for static fluid level variations in the well while being resistant to fouling.

Other devices, for example U.S. Pat. No. 4,826,406 to Wells, maintain the pump near the contaminant/groundwater interface; however, the groundwater is pumped along with the contaminant. Because of regulations governing the storage and disposal of groundwater pumped from a remediation well, it is desirable to pump only the contaminants from the well. Therefore, a need exists for an underground fluid recovery device which compensates for static fluid level variations in the well while maintaining the inlet of the pump near the surface of the contaminant/groundwater interface. In Wells, the remediation well fluid level is not sensed, therefore requiring the pump to be fully retracted before the beginning of every pump cycle and resulting in long cycle times and limited recovery rates. A need further exists for an underground fluid recovery device that senses fluid level within the remediation well.

In addition to the pump sensing fluid level in the well, it is also desirable that the pump be automatically self-optimizing; i.e., the pump automatically responding to changing system parameters such as fill head, discharge head and compressed air supply pressure. For example, in the pneumatic pumps disclosed in U.S. Pat. Nos. 4,527,633, 4,489,799, 4,826,406 and 5,027,902 to McLaughlin et. al, the fill and empty cycles are of a fixed duration preprogrammed in an open loop pneumatic or electric timer. In order to maximize pumping rates, an iterative process is required to achieve optimal pump performance, typically requiring that the timers be set by trained personnel familiar with the pump's design and function. However, the optimal fill and empty timed cycles are dependent upon system parameters which change over time to detract from optimal performance of the pump. For example, although the pump fill and empty timed cycles may be initially optimized when the pump is installed submerged in five or ten feet of water, these preprogrammed cycles do not provide optimal pump performance after the well is brought down by several feet. If the fill cycle is not adjusted to reflect the decreased head (increased fill time), the pump vessel will not fill completely during the preprogrammed fill cycle. A need therefore exists for an underground fluid recovery device that automatically adjusts to changing system parameters to maintain optimal pump performance. Preferably, in a pneumatic control circuit, all controls associated with the aforementioned pump would be located down well adjacent to or integral with the pump to minimize time lags.

Similarly, if the empty cycle is set too long or becomes too long due to changing system parameters, pump performance will deteriorate. Further, compressed air will be blown up the discharge line, creating two-phase flow which can damage downstream centrifugal pumps, valves and flowmeters and aggravating the build-up of mineral scale deposits, especially in landfill leachate pumping applications. A need therefore exists for an underground fluid recovery device that prevents compressed air from being blown up the discharge line following the empty cycle for a pneumatic pump.

SUMMARY OF THE INVENTION

An underground fluid recovery device for use in a well to pump underground fluids therefrom, the well having a static fluid pressure head relative to the underground fluid recovery device, is disclosed according to one embodiment of the present invention that includes a pump housing defining a reservoir therein, a power actuated inlet valve connected to the pump housing and fluidly coupled with the reservoir, the power actuated inlet valve being actuated between a closed position preventing flow of underground fluids into the reservoir and an open position permitting flow of underground fluids into the reservoir, means, separate from the static fluid pressure head, for actuating the power actuated inlet valve between the open and closed positions, discharge valve means, connected to the pump housing and fluidly coupled with the reservoir, for permitting flow of underground fluids from the reservoir, means for pressurizing and venting tile pump housing to pump underground fluids from the reservoir, and means for controlling the means for actuating and the means for pressurizing and venting to actuate the power actuated inlet valve open and to vent the pump housing, thereby defining a fill cycle in which underground fluids are permitted to flow into the reservoir, and to actuate the power actuated inlet valve closed and to pressurize the pump housing, thereby defining a pump cycle in which underground fluids are pumped from the reservoir through the discharge valve means.

An underground fluid recovery device for use in a well to pump underground fluids therefrom, the well having a static fluid pressure head relative to the underground fluid recovery device, is disclosed according to another embodiment of the present invention that includes a pump housing defining a reservoir therein, a power actuated inlet valve connected to the pump housing and fluidly coupled with the reservoir, the power actuated inlet valve being actuated between a closed position preventing flow of water and free-phase contaminants into the reservoir and an open position permitting flow of water and free-phase contaminants into the reservoir, means, separate from the static fluid pressure head, for actuating the power actuated inlet valve between the open and closed positions, first discharge valve means, connected to the pump housing and fluidly coupled with the reservoir, for permitting flow of free-phase contaminants from the reservoir, second discharge valve means, connected to the pump housing and fluidly coupled with the reservoir, for permitting flow of water from the reservoir, float valve means, upstream of the second discharge valve means and including a float movably disposed in the reservoir between open and closed positions, for permitting flow of water to the second discharge means in the open position and preventing flow of water to the second discharge means in the closed position, means for pressurizing and venting the pump housing to pump water and free-phase contaminants from the reservoir, and means for controlling the means for actuating and the means for pressurizing and venting to actuate the power actuated inlet valve open and to vent the pump housing, thereby defining a fill cycle in which water and free-phase contaminants are permitted to flow into the reservoir, and to actuate the power actuated inlet valve closed and to pressurize the pump housing, thereby defining a pump cycle in which water and free-phase contaminants are pumped from the reservoir, wherein the second discharge valve means is closed during the fill cycle, and wherein the float valve means and the second discharge valve means are open during a first portion of the pump cycle to pump water from the reservoir through the second discharge means and the float valve means is closed during a second portion of the pump cycle to pump free-phase contaminants from the reservoir through the first discharge means.

An underground fluid recovery device for use in a well to pump underground fluids therefrom is disclosed according to yet another embodiment of the present invention that includes a pump housing defining a reservoir therein, inlet valve means, connected to the pump housing and fluidly coupled with the reservoir, for permitting flow of underground fluids into the reservoir, discharge valve means, connected to the pump housing and fluidly coupled with the reservoir, for permitting flow of underground fluids from the reservoir, means for pressurizing the pump housing to pump underground fluids from the reservoir, means for venting the pump housing to permit the flow of underground fluids into the reservoir, fluid level sensing means, including a float having a specific gravity below the specific gravity of the underground fluids and movably disposed in the pump housing according to fluid level in the reservoir, for sensing fluid level in the reservoir above a first predetermined level, and means for controlling the means for pressurizing and the means for venting to define a pump cycle in which underground fluids are pumped from the reservoir through the discharge valve means and to define a fill cycle in which underground fluids are permitted to flow into the reservoir through the inlet valve means, the means for controlling pressurizing the pump housing in response to the fluid level sensing means sensing fluid level above the first predetermined level.

An underground fluid recovery device for use in a well to pump underground fluids therefrom is disclosed according to still yet another embodiment of the present invention that includes a pump housing defining a reservoir therein, inlet valve means, connected to the pump housing and fluidly coupled with the reservoir, for permitting flow of underground fluids into the reservoir, discharge valve means, connected to the pump housing and fluidly coupled with the reservoir, for permitting flow of underground fluids from the reservoir, means for pressurizing and venting the pump housing to pump underground fluids from the reservoir, fluid level sensing means for sensing underground fluid level in the well, and means for adjusting the level of the pump housing in the well in response to the fluid level sensing means, means for controlling the means for pressurizing and venting to vent the pump housing, thereby defining a fill cycle in which underground fluids are permitted to flow into the reservoir, and to pressurize the pump housing, thereby defining a pump cycle in which underground fluids are pumped from the reservoir through the discharge valve means, and means for controlling the means for adjusting to adjust the level of the inlet valve means of the pump housing a predetermined distance below the underground fluid level in the well.

One object of the present invention to provide an improved underground fluid recovery device.

Another object of the present invention is to provide an underground fluid recovery device that is resistant to fouling.

Yet another object of the present invention is to provide an underground fluid recovery device that compensates for static fluid level variations in the well while being resistant to fouling.

Still yet another object of the present invention is to provide an underground fluid recovery device that compensates for static fluid level variations in the well while maintaining the inlet of the pump near the surface of the contaminant/ground water interface.

A further object of the present invention is to provide an underground fluid recovery device that senses fluid level within the remediation well.

Another object of the present invention is to provide an underground fluid recovery device that automatically adjusts to changing system parameters to maintain optimal pump performance.

Still another object of the present invention is to provide an underground fluid recovery device that locates controls associated with a pneumatic pump down well adjacent to or integral with the pump to minimize time lags.

Still yet another object of the present invention is to provide an underground fluid recovery device that prevents compressed air from being blown up the discharge line following the empty cycle for a pneumatic pump.

These and other related objects and advantages will become apparent from the following drawings and written descriptions.

BRIEF DESCRIPTION OF THE DRAWINGS

FIG. 15A is a side cross-sectional view of a separator auto-pump according to a sixth embodiment of the present invention.

FIG. 15B is a perspective view of a float assembly of the separator auto-pump of FIG. 15A.

DESCRIPTION OF THE PREFERRED EMBODIMENT

Figure 1:
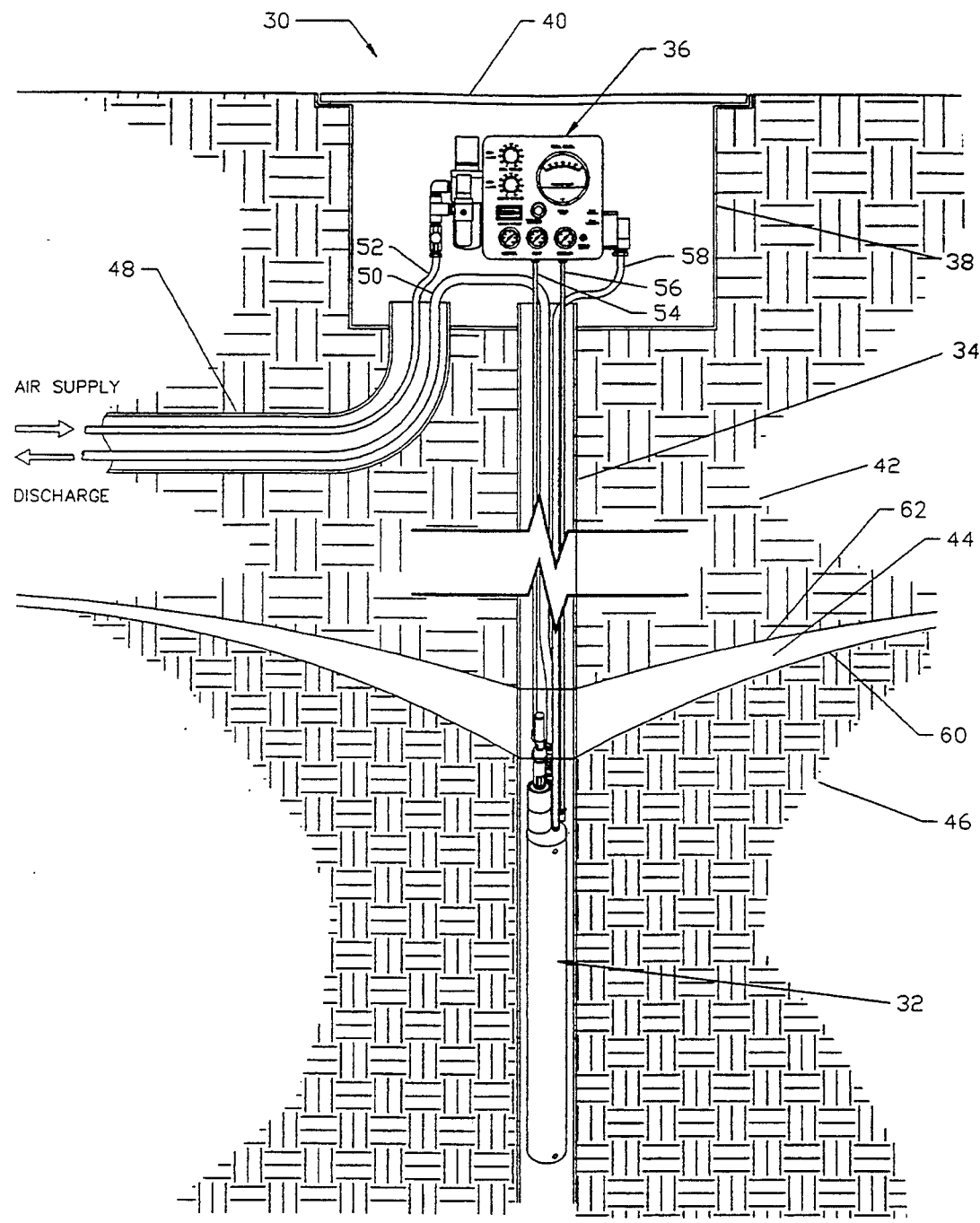
FIG. 1 is a side elevational view of a top filling total fluids pump installed in a remediation well according to a first embodiment of the present invention.

For the purposes of promoting an understanding of the principles of the invention, reference will now be made to the embodiments illustrated in the drawings and specific language will be used to describe the same.

It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a pumping system 30 is depicted which includes a total-fluids pump 32 supported within well casing 34 at approximately the contaminant/groundwater interface. Pump 32 is controlled by a controller 36 located within well head box 38 and protected by well-head box cover 40. The well casing 34 extends downwardly from the well head box 38 through the unsaturated earth 42 and the floating contaminant layer 44 into the saturated earth 46. The earth can vary from soil, clay, sand, gravel, bedrock and fractured stone to the numerous forms of refuse found in municipal and hazardous waste landfills. The well casing 34 is preferably made of plastic such as polyvinylchloride (PVC) and is perforated to allow water and contaminants to flow into the well casing by gravity. The perforations are preferably slots or holes extending the entire length of the well casing. Also contemplated are slots or holes extending only below a predetermined depth or only in a predetermined range as dictated by hydrogeological considerations. The diameter of the well casing is preferably four inches; however, a diameter of two to twelve or more inches is contemplated depending on the particular installation.

The well head box 38 is preferably constructed of plastic such as PVC similar to well casing 34; however, both the well casing and well head box are contemplated as being constructed of other corrosion resistant materials such as metal, concrete, or fiberglass. A hose conduit 48 contains lines 50 and 52 which communicate compressed air and pumped underground fluids between the well head box and an external compressed air source and fluid reservoir (not shown). In addition to protecting lines 50 and 52 from corrosion, conduit 48 provides the containment means typically required for transferring hazardous liquids. Preferably, the well head box 38 and hose conduit 48 are situated below grade as shown to protect against freezing protection and allow for unobstructed vehicle traffic above the well site. Nevertheless, also contemplated are above grade locations for the controller 36 and hose conduit 48 to accommodate cost, space, time and climatic considerations.

Compressed air is supplied to the controller 36 and pump 32 through the air supply hose or conduit 52. Other gasses are suitable as well, with the choice of the fluid pressure source depending on the most readily and economically available pressurized fluid. Pumped liquids are expelled under pressure through the discharge hose or conduit 50. Pump 32 is suspended in the well casing 34 by hoses or conduits 54, 56 and 58 and further by a cable secured to the pump and adjustably supported by a locking winch (not shown) at the top of the well casing 34. The depth of pump 32 is adjusted so that the inlet of the pump is situated immediately below the contaminant/water interface 60. As fluids are pumped from the well, a cone of depression 62 is formed which provides a fluid flow gradient that induces floating contaminants to flow towards the well within a certain radius or area of influence. The optimal depth of the pump and, as a result, the depth of the cone of depression depends on the particular system and treatment goal. For example, a deep cone creates a steep gradient and greater free-phase contaminant recovery, but requires that a much larger volume of water must then be treated.

Although only one well is shown in FIG. 1, a plurality of wells similar to that shown in FIG. 1 are contemplated for larger sites. For example, a typical gas station clean-up may require as few as four to ten wells, while as many as one hundred or more wells may be required at a large landfill to keep leachate levels below environmentally mandated compliance levels.

Figure 2:
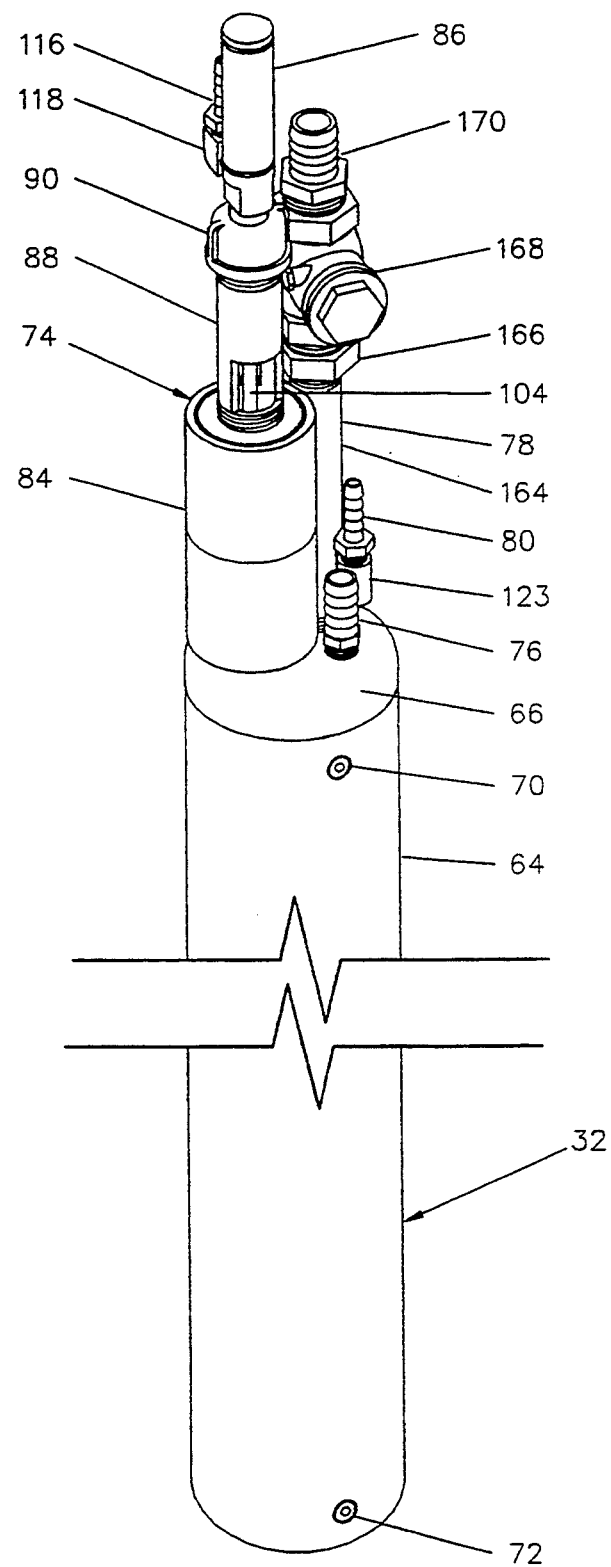
FIG. 2 is a perspective view of the total fluids pump of FIG. 1.
Figure 4:
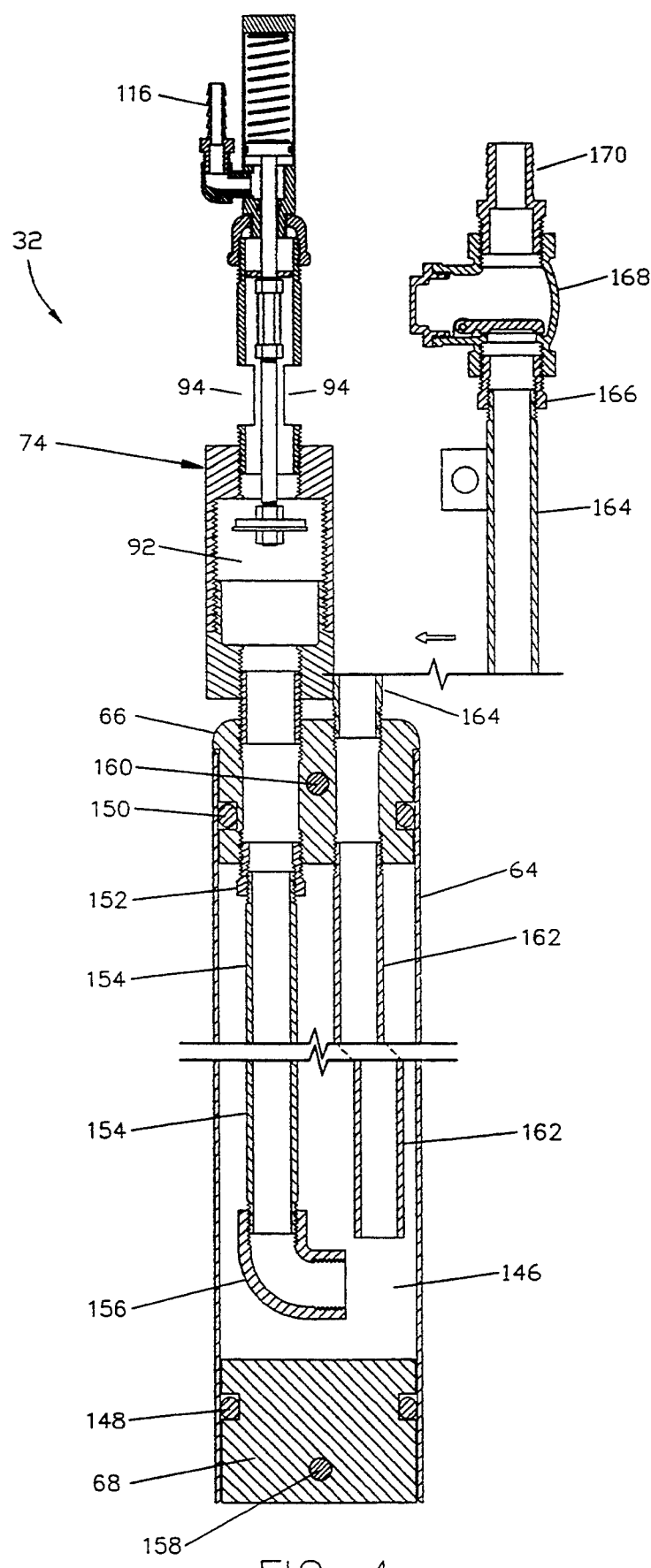
FIG. 4 is a side cross-sectional view of the total fluids pump of FIG. 1.

Referring now to FIG. 2, the components of pump 32 are shown in greater detail. Pump 32 includes a pump vessel 64 having vessel end members 66 and 68 (FIG. 4). The top end member 66 is rounded to prevent the pump from catching any joints in the well casing when the pump is removed from the well. Countersunk screws 70 and 72 are similarly employed to fasten the vessel end members to pump vessel 64. Connected to the top end member 66 are a pilot inlet valve assembly 74, an air/vent hose connector 76 and a discharge check valve assembly 78 and a bubbler line hose connector 80.

Figure 3A:
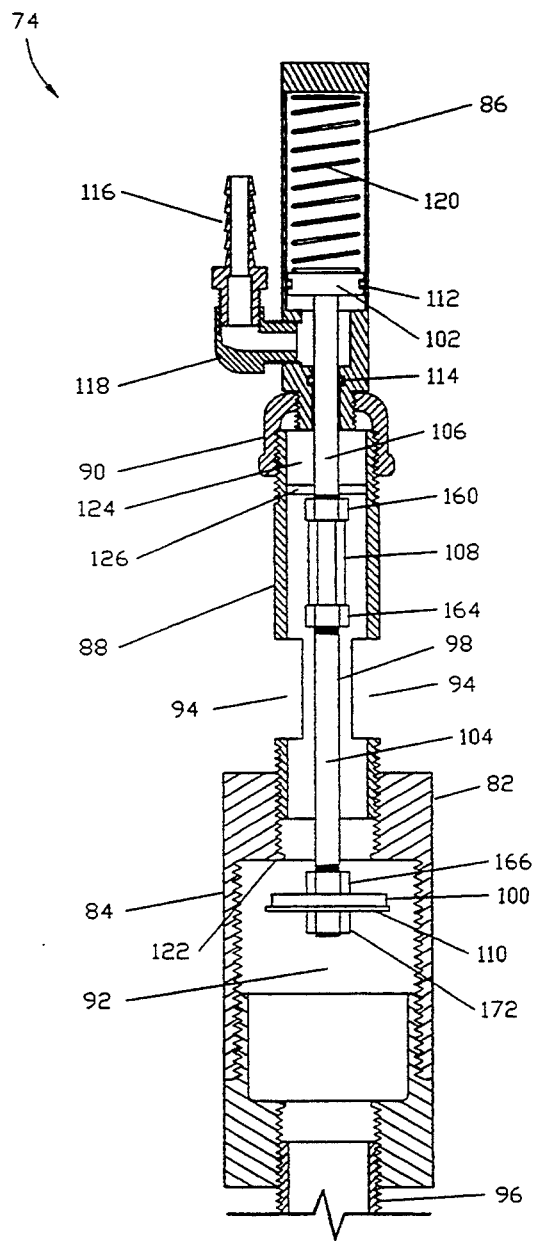
FIG. 3A is a side cross-sectional view of a piloted inlet valve of the total fluids pump of FIG. 1.

Referring now to FIG. 3A, the piloted inlet valve assembly 74 includes generally a valve housing assembly 82 comprising a valve poppet housing 84 connected to a piston cylinder 86 via an inlet valve nipple 88 and cap 90. Valve poppet housing 84 defines a poppet chamber 92 fluidly separated from cylinder 86 and which receives underground fluid from inlet ports 94 of inlet valve nipple 88 and supplies the underground fluid to pump vessel 64 through pump mounting nipple 96. Reciprocatably disposed within housing assembly 82 is a poppet assembly 98. Poppet assembly 98 includes a valve poppet 100 connected to a piloted valve piston 102 via piston rods 104 and 106 and coupling nut 108. Valve poppet 100 is constructed of VITON reinforced by a stainless steel backing plate 110. Preferably, the pneumatic cylinder 86, inlet cap 90, inlet nipple 88, valve poppet housing 84 and mounting nipple 96 are each joined together by tapered threaded connections treated with standard pipe sealant prior to assembly to prevent leakage. Also, O-rings 112 and 114 are further provided to prevent leakage and seal the valve piston cylinder from the contaminated groundwater.

Unlike prior static pressure responsive check valves which operate in response to fluid pressure head in the well casing, piloted inlet valve 74 is actuated independent from fluid pressure head in the well casing by compressed air supplied to valve piston 112 and sealed cylinder 86 via inlet pilot connector 116 and elbow 118. In the preferred embodiment, piloted inlet valve 74 is maintained normally open by a compression spring 120 which exerts a downward force on piston 112. To close the inlet valve, compressed air is supplied to valve cylinder 86 at piston 112 to drive the piston upward opposite the downward spring force and seat the reinforced poppet 100 against sealing surface 122. Pressure applied to the inlet valve chamber 92 during the pump emptying cycle further assists in sealing the poppet 100 against sealing surface 122. When the inlet valve is open (i.e., when compressed air is not applied to pilot nipple 116), fluids from the well flow by gravity through inlet ports 94 into the inlet valve chamber 92 and through pump mounting nipple 96 into the pump body 64.

In addition to protecting the actuating piston 102 from the corrosive effects of the contaminated groundwater, piloted inlet valve 74 also largely protects piston rod 106 from contact with the contaminated groundwater to reduce mineral deposits which can detract from the performance of the valve, for example, by preventing the piston rod from sliding freely. Inlet valve nipple 88 further defines a domed central chamber 124 fluidly separating cylinder 86 from the contaminated groundwater. Because the portion of the piston rod assembly 98 extending into the inlet nipple 88 is above inlet ports 94, air trapped in the nipple prevents direct contact between the piston rod and the contaminated groundwater. The piston rod is further protected by a rubber wiper 126 and lubricating grease packed into the annular space immediately above the rubber wiper.

Figure 3B:
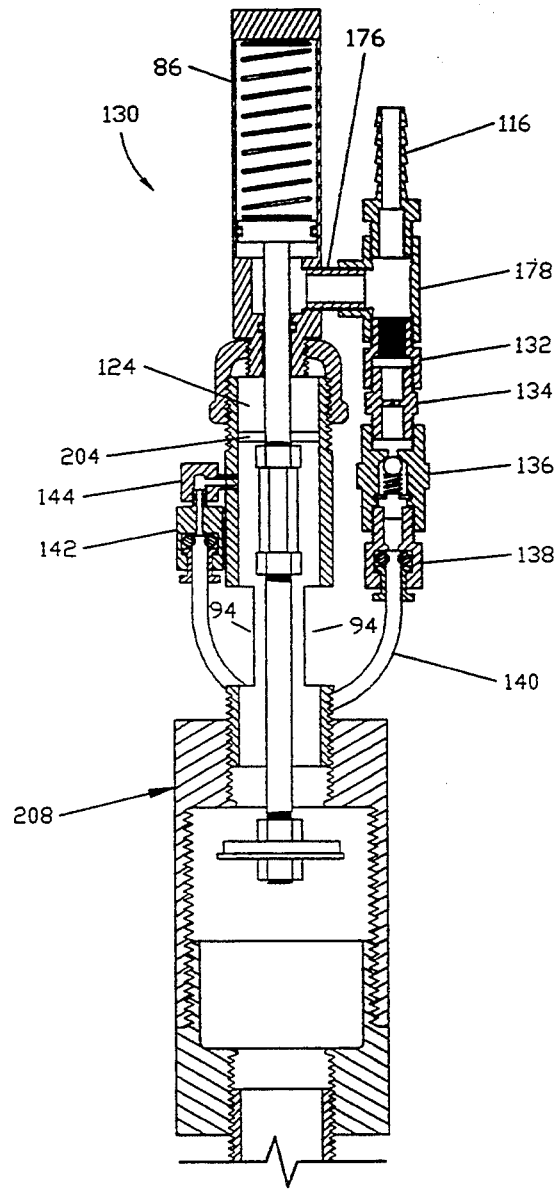
FIG. 3B is a side cross-sectional view of an alternate piloted inlet valve of the total fluids pump of FIG. 1.

Referring now to FIG. 3B, an alternate piloted inlet valve 130 is provided to minimize the effects of contaminated ground water vapor in the air trapped in chamber 124 from contaminating the piston rod. Compressed air for actuating the valve 130 is also supplied to the central domed chamber 124 to ensure that fresh air is always present in chamber 124 above inlet ports 94 and further protecting piston rod assembly 98 from contact with contaminated groundwater. Air supplied to chamber 124 is filtered by filter 132 and metered across orifice 134 to control the flow of substantially moisture-free air into chamber 124. Check valve 136 protects against either the air or contaminated groundwater from reverse flow back into cylinder 86. Connector 138, nylon tube 140, connector 142 and elbow 144 complete the air flow circuit between inlet valve hose connector 116 and chamber 124.

Also contemplated is the use of pressurized hydraulic fluid or other non-corrosive liquid, rather than compressed air, as the pilot medium. Hydraulic fluid is substantially incompressible and, therefore, provides a quicker response than air. Also, hydraulic fluid is substantially moisture free, unlike air which can become contaminated with well vapors and introduce moisture condensed from the vapor into cylinder 86. Other fluid operated actuators are also contemplated as the inlet valve actuating means in addition to the pneumatic piston 112 and cylinder 86 disclosed herein. For example, a piston with a diaphragm, rolling diaphragm operator or hydraulic operator known to ones skilled in the art can be employed to actuate the piloted inlet valve.

Referring now to FIG. 4, pump vessel 64 is shown in greater detail. Pump 32 is a total fluids pump and, as such, fills and empties substantially all of the interior volume of pump vessel 64. Pump 32 takes in both water and any free-phase contaminants that may be present (or pure contaminants, if large quantities are present) and pumps the mixture up and out of the well under pressure. A complete pumping cycle includes a fill cycle and a discharge cycle, the durations of which are determined by independent timers in the pump controller 36 (FIG. 1). During the fill cycle, the inlet valve's pilot line (at connector 116) is not pressured and the piloted inlet valve remains open. When pump 32 is positioned as indicated in FIG. 1, well fluids flow by gravity into reservoir 146, defined by pump body 64 and end members 66 and 68 and sealed against leakage therefrom by O-rings 148 and 150. Inlet ports 94, poppet chamber 92, mounting nipple 96, vessel end member 66, reducer bushing 152, inlet drop pipe 154, and drop pipe elbow 156 provide means for preventing free-phase contaminants such as gasoline from floating back up through the inlet valve and into the well and for routing well fluids into reservoir 146 with a minimum of turbulence as further described hereinafter.

The pump body 64 is preferably constructed of a corrosion resistant material, such as stainless steel. Stainless steel also provides increased strength so that the thickness of the walls of pump body 64 are reduced to maximize internal pump volume for a given well casing diameter. The top and bottom end members 66 and 68 are preferably fabricated from a rigid chemical resistant plastic easily machined and relatively light compared to stainless steel. The top and bottom end members are fixed relative to pump body 64 by stainless steel retaining pins 158 and 160, and the retaining pins are attached to pump body 64 by stainless steel countersunk retaining screws 70 and 72.

During the fill cycle, air displaced by the well liquids is forced through a passage in the top end member (not shown) to the air/vent hose connector 76 (FIG. 2), up air/vent line 58 (FIG. 1) and is vented to the atmosphere through a quick exhaust valve subsequently described in FIG. 18. Preferably, the duration of the fill cycle is predetermined slightly longer than the time it actually takes for the pump vessel to fill completely to ensure filling chamber 146 at a decreased available well fluid pressure head. After the fill cycle, the air/vent line 58 and inlet valve pilot line 54 (FIG. 1) are pressurized, thereby pressurizing reservoir 146 and closing the piloted inlet valve. With the inlet valve now closed tightly, compressed air entering the pump vessel through air/vent hose barb 76 (FIG. 1) and top end member 66 forces fluids in the pump vessel up discharge drop pipe 162, through top end member 66, discharge nipple 164, reducer bushing 166, discharge check valve 168, discharge hose connector 170, and out discharge line 50 (FIG. 1). During the pump fill cycle, discharge check valve 168 prevents fluids in the length of discharge line extending between the pump and well head from reverse flowing back into the pump vessel.

Although inlet drop pipe 154 and elbow 156 are not required for proper operation of pump 32, inlet drop pipe 154 prevents free-phase contaminants from floating back up through the inlet valve and into the well. In the absence of inlet pipe 154, floating contaminants under certain conditions float back up through the inlet valve and into the well. For example, this can occur when small to moderate amounts of floating contaminant are present and the fill cycle is relatively long. The inlet drop pipe has further significance when both top and bottom inlets are employed, as hereinafter shown and described in connection with in FIG. 5, Both inlet drop pipe 154 and inlet elbow 156 reduce turbulent mixing by supplying well fluids near the bottom of chamber 146 as well liquids enter the pump vessel.

Figure 5:
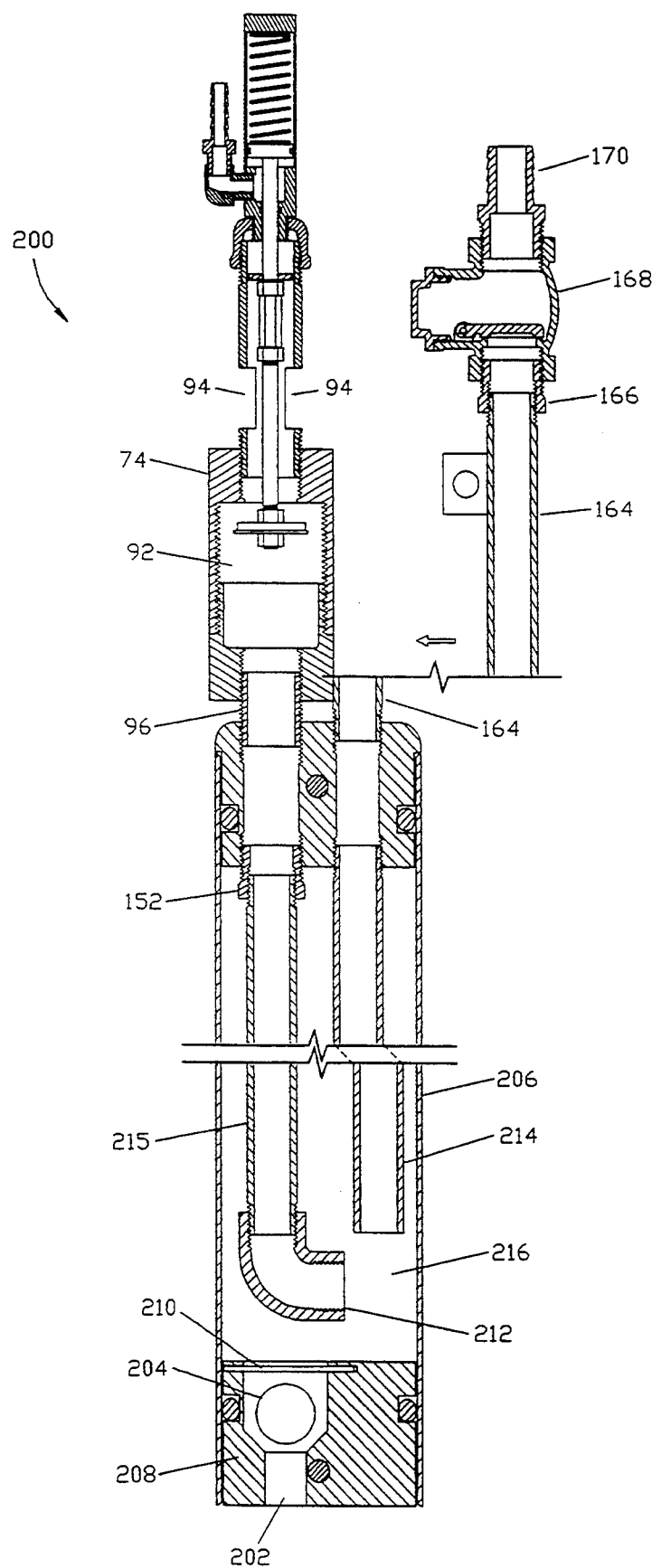
FIG. 5 is a side cross-sectional view of a top and bottom filling total fluids pump with a piloted top inlet valve according to a second embodiment of the present invention.

Referring now to FIG. 5, pump 200 is similar to pump 32 except that well fluids can also enter the pump vessel through a check valve built into the bottom of the pump end. During the fill cycle, well static pressure head flows well fluids through bottom inlet port 202, past ball 204 and into pump body 206. The well casing pressure head at inlet port 202 is equal to the distance from the bottom of the pump to the static fluid level of the well. The ball is restrained in bottom member 208 by a retaining pin 210. Other static pressure responsive check valve designs, such as swing, disk or double-flapper type check valves are also contemplated for bottom filling of the pump vessel.

By locating the top and bottom inlets (elbow 212 and port 202) at nearly the same elevation, nearly the same well fluid pressure head forces well fluid into the pump vessel. Inlet drop pipe elbow 212 permits he pump vessel to fill more quickly by redirecting the momentum of liquids entering through the top of the pump vessel away from the fluids entering through the bottom of the pump vessel, thereby preventing the turbulent collision of the two inlet streams. Further, by locating the bottom end of the discharge drop pipe 214 slightly above the inlet drop pipe elbow 212, liquids remain in the inlet drop pipe throughout the discharge cycle. At the beginning of the next fill cycle after the pump vessel is vented, this remaining head of liquid in the inlet drop pipe 215 and elbow 212 flows by gravity into chamber 216, thereby drawing a slight vacuum in the inlet drop pipe and effectively pulling well fluids in through the piloted top inlet valve 74.

Figure 6:
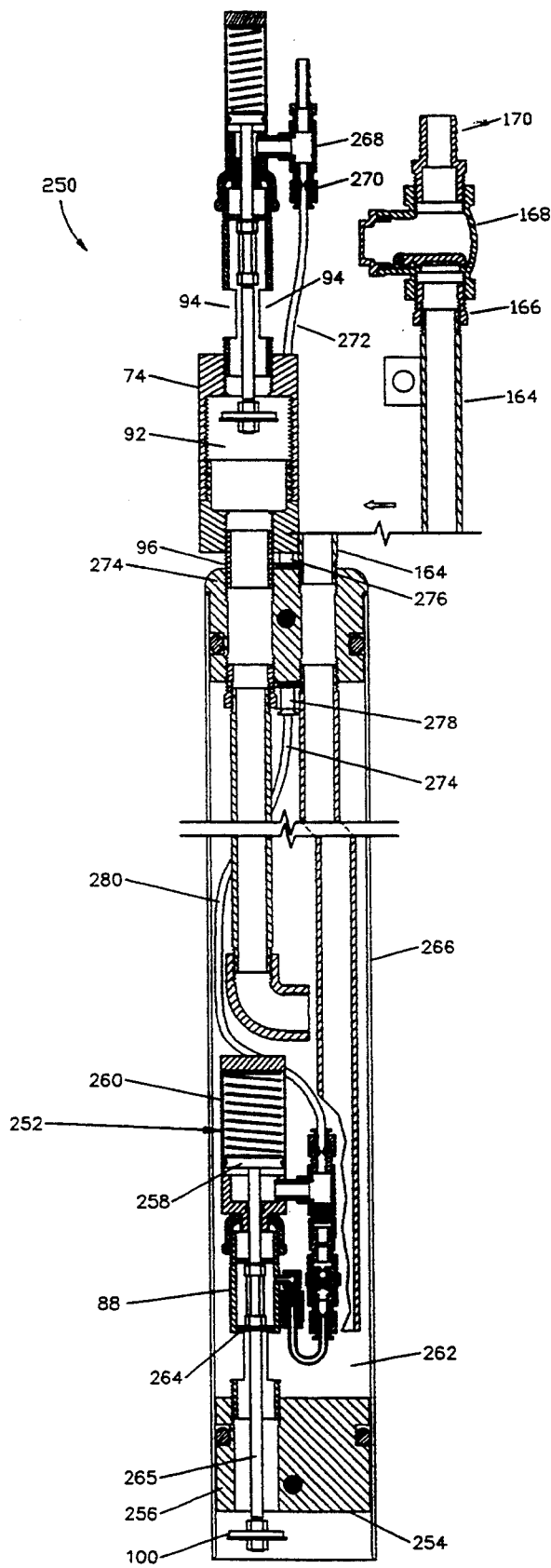
FIG. 6 is a side cross-sectional view of a top and bottom filling total fluids pump with piloted top and bottom inlet valves according to a third embodiment of the present invention. with piloted top and bottom inlets.

Referring now to FIG. 6, a total fluids pump 250 similar to pump 200 is shown. Pump 250 fills from both the top and bottom; however, both the top and bottom inlet valves are piloted and actuated by compressed air. Although a bottom static pressure responsive check valve is less prone to failure since more pressure head is available to operate the valve, a piloted bottom inlet valve nevertheless is still more resistant to the effects of mineral scale deposits, since the actuating air pressure is limited only by the available regulated source pressure, rather than merely the static pressure head available in the well.

Bottom piloted inlet valve assembly 252 is similar to top inlet valve assembly 130 of FIG. 3B except as follows. First, the valve poppet 100 seats against the bottom surface 254 of end member 256. Second, larger piston 258 and cylinder 260 diameters are required in order to ensure that a tight seal is maintained during the pump discharge cycle since pressure in the pump chamber pushing down on poppet 100, thereby working against, rather than with, pilot pressure pushing up on piston 258. Third, viton washer 264 is added to inlet valve nipple 88 to prevent the force of liquid rushing up around rod assembly 265 from displacing the air bled into the upper end of inlet nipple 88. Also, in the preferred embodiment, bottom end member 256 is recessed in the pump body 266 to protect the bottom inlet valve during handling prior to installation.

At the beginning of the discharge cycle, the same pressure signal that pilots the top inlet valve also pilots the bottom inlet valve. The top inlet valve pilot signal is tapped via tee 268, connector 270 and nylon tubing piece 272, which enters top end member 274 through connector 276. Porting internal to the top end member transmits the pneumatic signal from connector 276 to connector 278. Once inside the pump vessel, the signal is transmitted to the bottom piloted inlet valve assembly 250 through nylon tubing 280.

Figure 7:
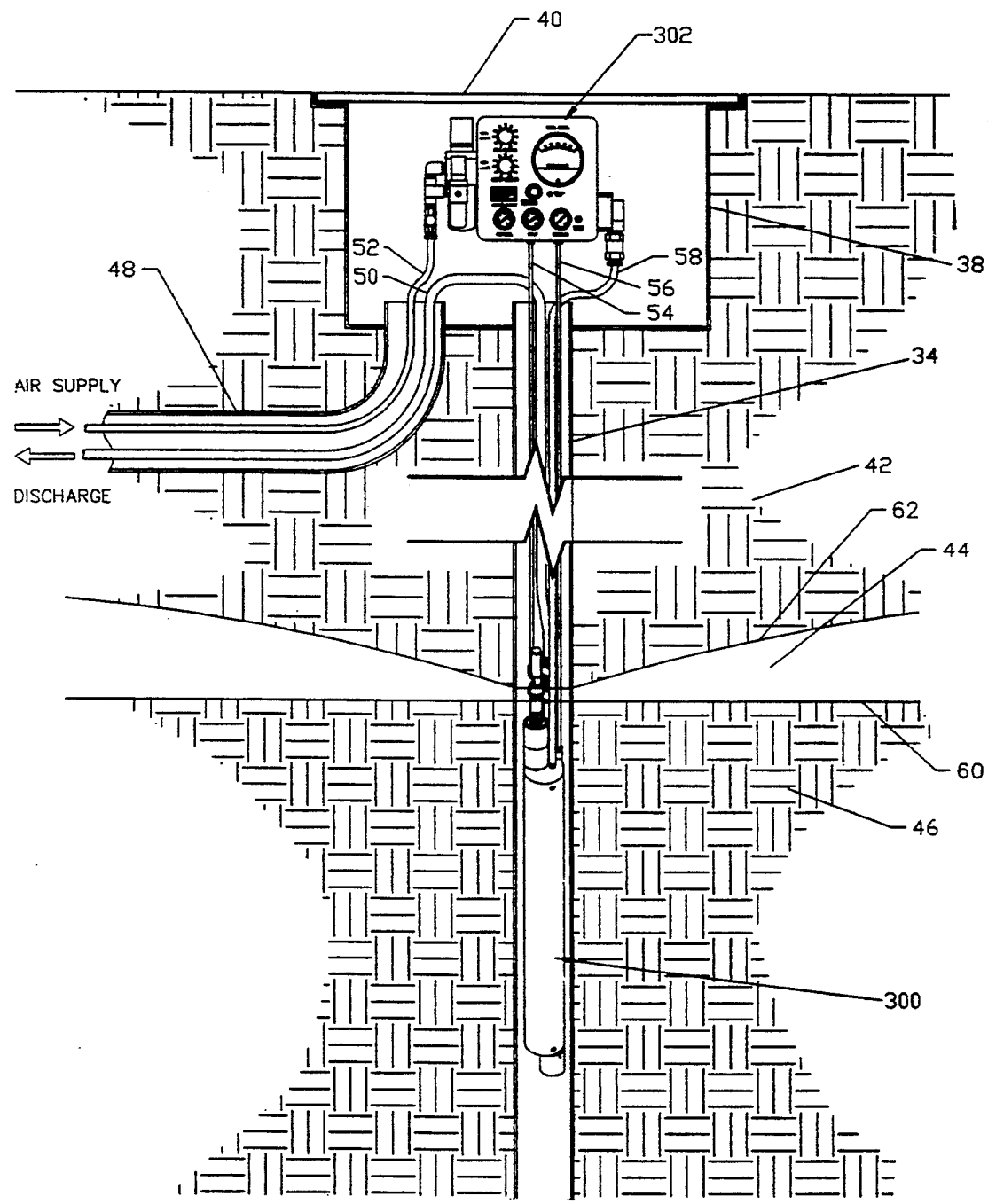
FIG. 7 is a side elevational view of a separator pump installed in a remediation well according to a fourth embodiment of the present invention.

Referring to FIG. 7, a separator pump 300 including a piloted inlet valve is shown supported within well casing 34 at approximately the contaminant/groundwater interface. Separator pump 300 skims both water and free-phase contaminants from the static surface of the well, separates the two by gravity within the pump vessel, expels water from the pump back into the well and pumps pure contaminant Out of the well under pressure. Similar to the total fluids pumping system shown in FIG. 1, separator pump 300 is suspended from the top of the wellhead by a rope or cable (not shown). A controller 302 is mounted in the wellhead box 38 or some other remote location. Compressed air is supplied to the pump controller through hose 52 and pure contaminant, rather than a mixture of contaminant and groundwater, is pumped out of the well through discharge line 50. Hoses connected to the pump include the aforementioned discharge line, an air/vent line 58, a bubbler line 56 and a inlet valve pilot line 54. Since no water is removed from the well, only the surface of the free-phase contaminant 62 is depressed. The surface of the water table 54 is largely unaffected. To recover free-phase contaminants effectively, the position of the separator pump is preferably adjusted so that its inlet is immediately below the contaminant/water interface 60.

Figure 8:
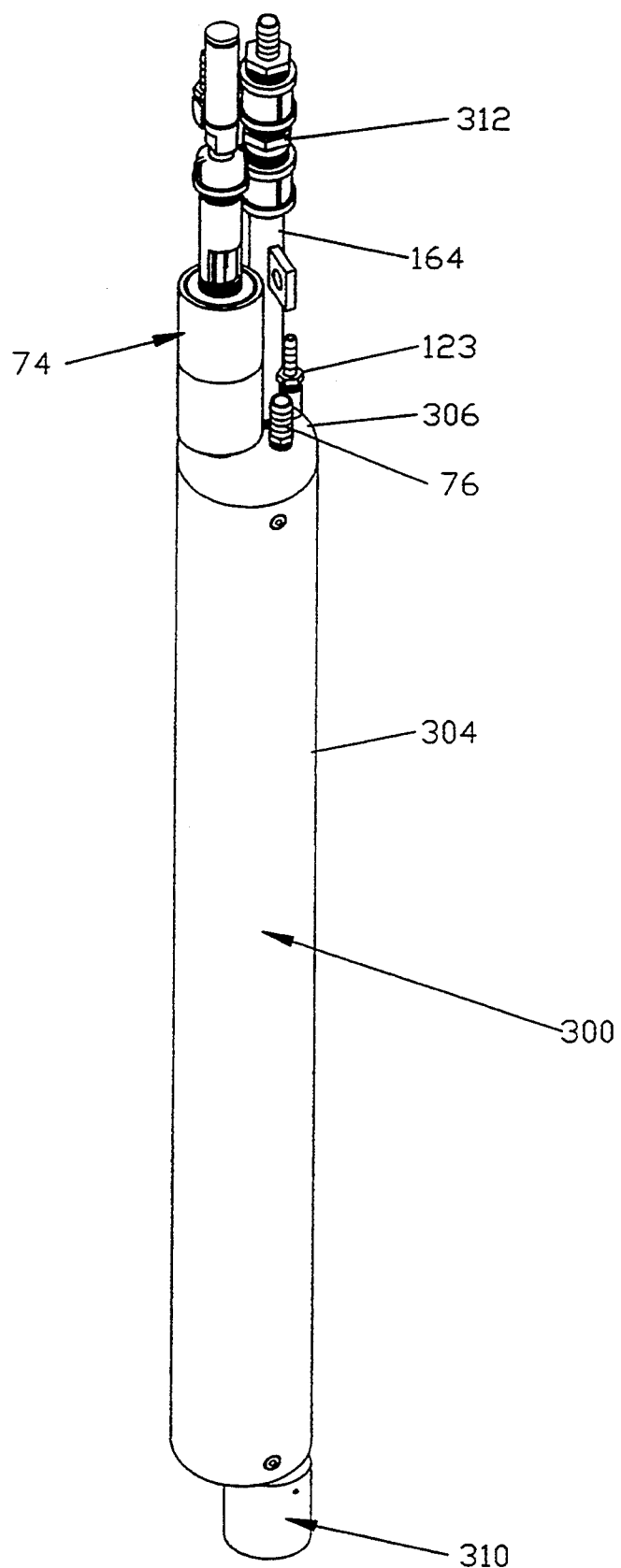
FIG. 8 is a perspective view of the separator pump of FIG. 7.
Figure 9:
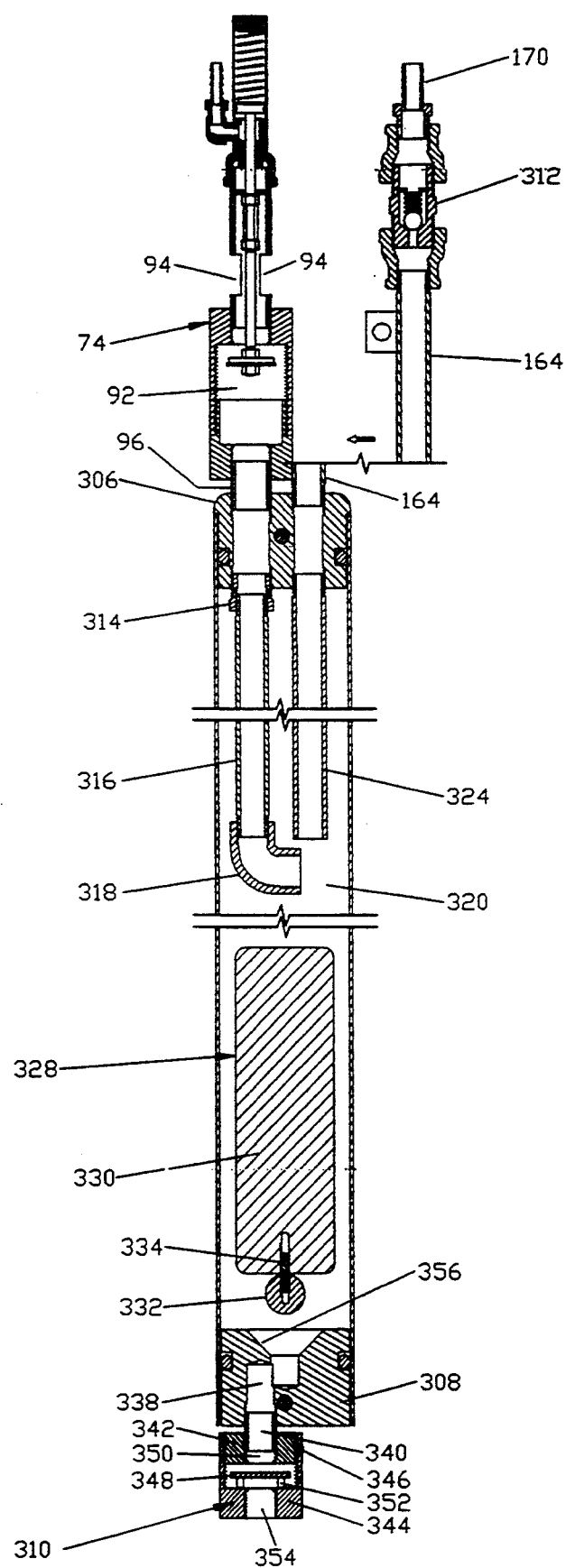
FIG. 9 is a side cross-sectional view of the separator pump of FIG. 8.

Referring now to FIG. 8, the external components of separator pump 300 are similar to those of a total fluids pump. The body of the pump is comprised of a pump vessel 304 and top and bottom end members 306 and 308 (FIG. 9). Similar to a total fluids pump, connected to the top end member 306 are a piloted inlet valve assembly 74, an air/vent hose barb 76 and a discharge nipple 164. However, rather than pumping both water and contaminants from the top of the pump, pump 300 pumps water back into the water table through the bottom of the pump and pumps product or contaminant out of the well from the top of the pump. As such, a water discharge check valve 310 is disposed at the bottom end of the pump and a modified discharge check valve 312 is disposed at the top end of the pump.

Figure 10:
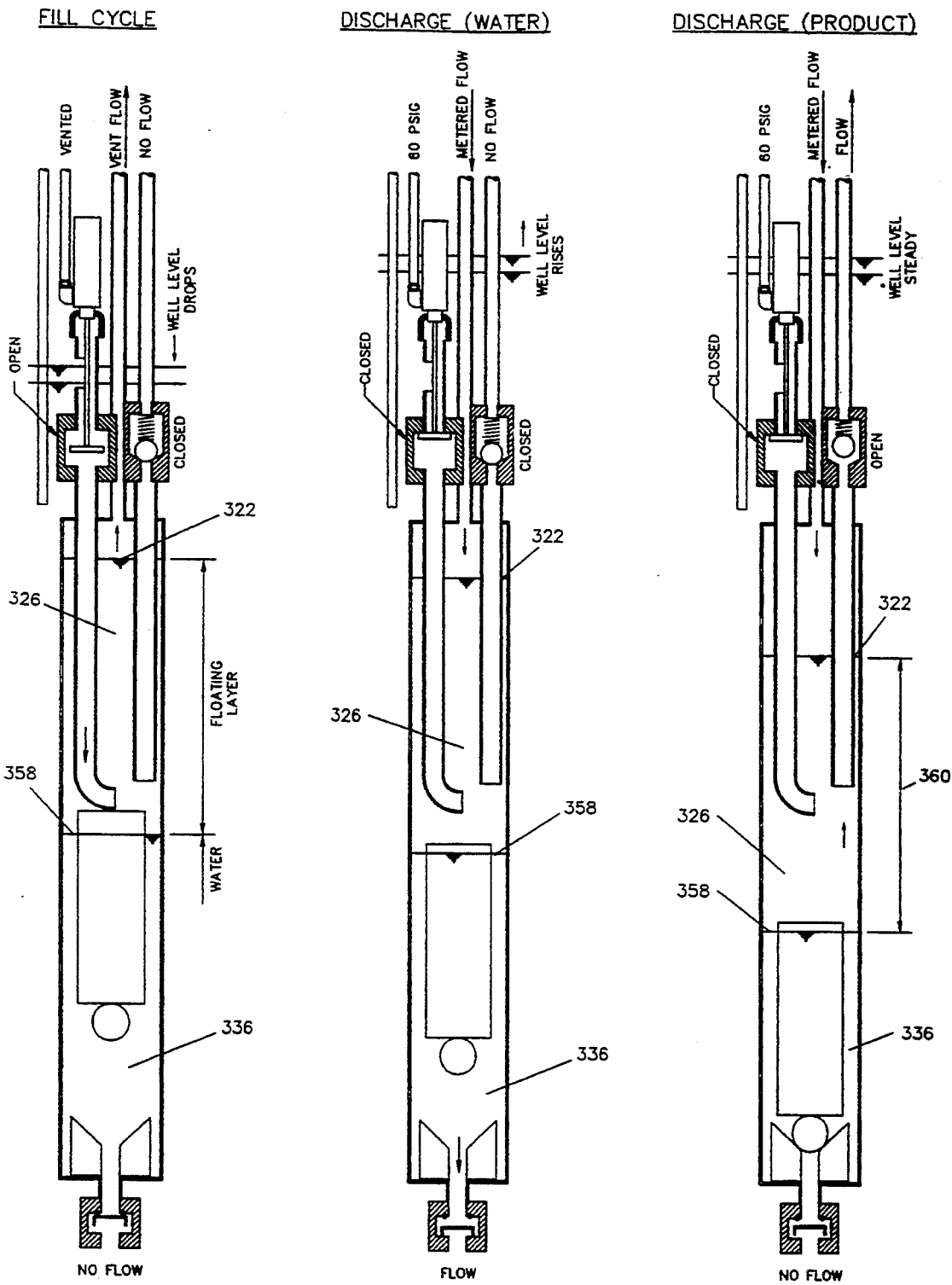
FIG. 10A is a side cross-sectional view of the separator pump of FIG. 8 depicted in its fill cycle.
FIG. 10B is a side cross-sectional view of the separator pump of FIG. 8 depicted in its water discharge cycle.
FIG. 10C is a side cross-sectional view of the separator pump of FIG. 8 depicted in its product discharge cycle.

Referring now to FIGS. 9-10, the operation of separator pump 300 is shown in greater detail. Similar to total fluids pump, the pumping cycle for separator pump 300 includes a fill cycle and a discharge cycle, the durations of which are independently adjustable via controller 302. During the fill cycle, piloted inlet valve 74 is open, allowing both floating contaminants and water in the well to flow by gravity into the inlet valve, through vessel end member 306, reducer bushing 314, inlet drop pipe 316, elbow 318 and into chamber 320 of the pump vessel. Similar to the total fluids pump, inlet drop pipe 316 prevents contaminants from floating back out the inlet valve. Since the static liquid surface 322 in FIG. 10A never drops below the bottom end of discharge pipe 324 during the discharge cycle, positioning the inlet elbow 318 just below the discharge pipe ensures that liquids enter the pump vessel below the static liquid surface 322 with reduced splashing and turbulence. The fill cycle for the separator pump 300 is typically longer than that of a total fluids pump and ranges from 30 to 60 or more seconds. A longer filling time is required because the pump is generally used for skimming, and due to the reduced contaminant static pressure head, liquids weir into the inlet port more slowly. Also, extra time is desirable for the lighter-than-water immiscible contaminants to form the floating layer 326 shown in FIG. 10A.

Separator pump 300 includes a float assembly 328 for controlling the discharge of water through the bottom of the pump vessel. Float assembly 328 includes a float body 330 that is attached to a ball 332 via threaded stud 334. The float body is fabricated from solid plastic rod and has a specific gravity of 0.94. The ball 332 may be viton, nylon, delrin, teflon or other plastic or elastomer compatible with the fluids in the pump. With a composite specific gravity near 0.94, the float assembly 328 will sink in gasoline or any other contaminant with a specific gravity less than 0.94 and will float in water. At the beginning of the discharge cycle, the inlet valve 74 is piloted closed and air is slowly metered into the top of the pump vessel through the air/vent hose barb 76 (FIG. 8) which is ported directly into the pump vessel through the top end member 306. The metered flow of air into the top of the pump vessel forces water 336 out the bottom of the pump through passage 328 in bottom end member 308, through nipple 340 and water discharge check valve assembly 310 and back into the well (FIG. 10B).

The water discharge check valve 310 includes a top member 342 threadedly engaged into bottom member 344 and retained by set screw 346. During the water discharge cycle, pressure differential across check valve assembly 310 unseats disk 348 allowing water to flow out through port 350, around disk 348 between legs 352 thereof and out port 354. During the fill cycle, when the pressure differential is reversed, disk 348 seats against top member 342 to prevent fluid flow therethrough. As such, check valve assembly 310 ensures that well fluids enter the pump vessel only through piloted top inlet valve 74 during the fill cycle. Conversely, during the water discharge cycle, check valve assembly 310 permits the discharge of water through the bottom of the pump. The performance of check valve assembly 310 is enhanced by fabricating disk 328 from the same material as float 330 (i.e., having a specific gravity of 0.94) so the buoyant force of the disk 348 in water seats the disk independent of pressure differential.

As water is pumped out through the bottom of the pump, floating layer 326 and float assembly 328 slowly drop until ball 332 seats against the conical surface 356 machined into vessel end member 308, thereby forming a liquid tight seal. During the water discharge cycle, flow through discharge drop pipe 324 is prevented by spring loaded discharge check valve 312, which cracks at approximately 3 psi., and also by the head of liquid above the check valve in the discharge line. After the float assembly 328 seats in the bottom of the pump, pressure inside the pump vessel builds until fluid is pumped up the discharge line (FIG. 10C). When ball 332 is seated, the contaminant/water interface 358 in the pump is below the bottom of discharge drop pipe 324 so that only contaminant is pumped out of the well. After the contaminant above the bottom of discharge pipe 324 is pumped, a small amount of compressed air will bleed into the discharge line for the remainder of the discharge cycle. When the separator pump is first installed in a remediation well, no product is pumped until the floating layer 326 builds to a thickness 360 (FIG. 10C).

Figure 18:
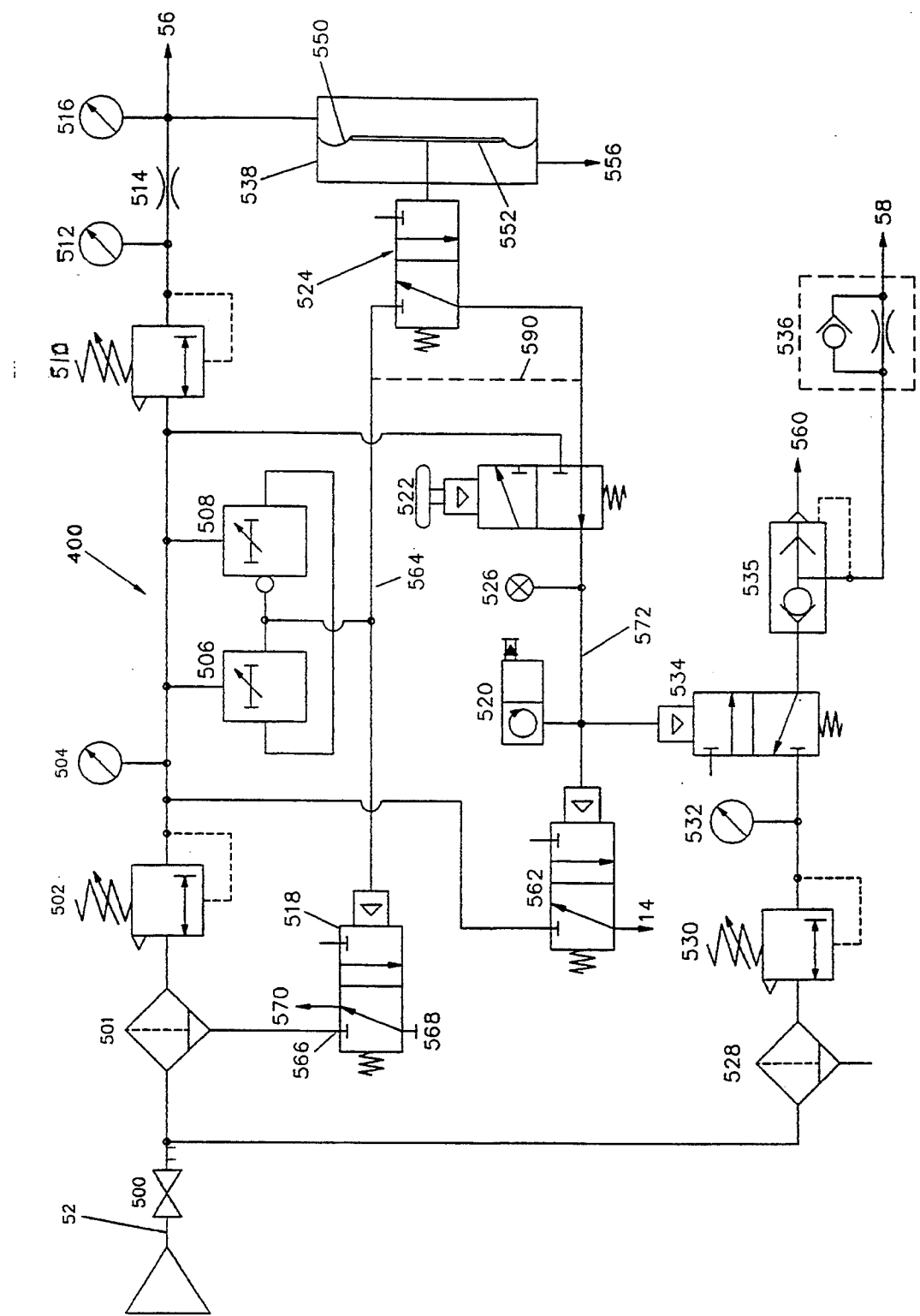
FIG. 18 is a pneumatic Circuit diagram of a pneumatic controller for use with total fluids and separator pumps according to a ninth embodiment of the present invention.

Referring now to FIG. 18, a control circuit 400 is shown for use with total fluids pump 32 and separator pump 300. The control circuit for the total fluids pump is similar to the control circuit for the separator pump, except for level control device 524 and flow control valve 536 discussed subsequently in greater detail. As such, the discussion pertaining to the control circuit shown in FIG. 18 is generally applicable to both the total fluids and separator pumps. The components in the control circuit are preferably integral with the total fluids pump controller 36 (FIG. 1) or the separator pump controller 302 (FIG. 7). In the preferred embodiment, the controller components making up the control circuit are pneumatic to minimize the risk of an explosion should the controller be operated in the presence of flammable vapors. The two primary functions of the control circuit are the timing of the fill and discharge cycles and level control. The purpose of level control is to stop pumping when well level has been drawn down to within a few inches of the inlet port, thereby conserving compressed air until well fluid level accumulates for pumping to economically continue, typically three or four inches of static pressure head. Also contemplated are electronic elements which perform similar functions as the pneumatic elements. For example, the timing and level control functions could be performed by standard digital or analog electronic devices if the controller is located in a non-hazardous area or if intrinsically safe electronic components are employed in the control circuit.

Compressed air is delivered through line 52 to control circuit 400 at pressures typically between 90 and 150 psig. All compressed air to the system passes through system shut-off valve 500. From valve 500, compressed air is delivered in parallel to filter 501 and filter 528. Filter 501 filters compressed air supplied to control pressure regulator 502, and filter 528 filters compressed air supplied to pump air regulator 530. Output pressures of the control pressure regulator 502 and pump air regulator 530 are indicated at gauges 504 and 532, respectively. Control air from control pressure regulator 502 is supplied to fill timer 506, empty timer 508, pilot valve 562, manual pump valve 522 and bubbler pressure regulator 510. Fill timer 506, a standard normally non-passing delay timer, is connected to empty timer 508, a standard normally passing delay timer, to produce a pulsed pneumatic signal in line 564 with independently adjustable 'on' and 'off' durations. This pulsed pneumatic signal is routed to both automatic drain valve 518 and level control assembly 524. Valve 518 is a poppet-style piloted three-way valve. The 'out' port 568 of valve 518 is plugged and the valve is piloted through line 564 at the beginning of the pump's empty cycle so that flow is allowed between 'in' port 566 to 'exhaust' port 570 for a split second, thereby permitting any condensation collected in the bowl of filter 501 to be blown out. The same occurs at the end of the discharge cycle when line 564 is vented.

Bubbler pressure regulator 510 supplies low pressure air (typically 5 to 10 psig.) to restrictor orifice 514 via bubbler pressure gauge 512. Air bled through restrictor orifice 514 ensures that line 56 is always completely filled with air; i.e., down to coupling 123 of the pump (FIGS. 1 and 2). As such, the air pressure in line 56, displayed on gauge 516 in units of "inches of water"0, is maintained to represent the depth of the well. The pneumatic signal in line 56 is also supplied to diaphragm 550 and pressure plate 552 inside differential pressure chamber 538 of level control device 524. When the well is not vented, as is the case when a vacuum is applied to the well for the purpose of vapor methane recovery, line 556 can be plumbed into the well so that the differential pressure across diaphragm 550 is still representative of well level.

In the discharge cycle, level control three-way valve 524 actuates when a predetermined differential pressure is applied across diaphragm 550, thereby permitting the air signal in line 564 to be conducted to manual pump pushbutton 522 and pump air valve 534. The signal in line 572 also actuates pneumatic indicator 526, cycle counter 520 and pilot valve 562. When actuated, pilot valve 562 permits compressed air into line 54 to close the piloted inlet valve 74 (FIGS. 2 and 8). Similarly, when pump air valve 534 is actuated, compressed air supplied by regulator 530 is conducted through pump air valve 534, quick exhaust valve 535 and down to the pump through line 58. At the end of the discharge cycle, compressed air from the pump vessel vents through the quick exhaust valve's exhaust port 560, rather than back into pump air valve 534, thereby protecting pump air valve 534 from any moisture and corrosive constituents entrained in the discharge air from the pump.

The porting of components 528, 530, 534 and 535 is much larger than that of the other pneumatic components in the control circuit to accommodate the high air flow rates to and from the pump vessel. For example, the inside diameter of the tubing and fittings connecting these components may range from ¼ to ½ inch, whereas that of the other pneumatic components are ⅛ inch or less.

The control circuit for separator pump 300 operates similarly to the control circuit for the total fluids pump 32 except as follows. First, because separator pump 300 runs continuously independent of well level, level control device 524 is bypassed at 590 or eliminated from the circuit. Second, a flow control valve 536 is added between quick exhaust valve 535 and vent line 58. Whereas a high air flow rate during the discharge cycle for a total fluids pump is desirable, air must be bled slowly for a separator pump during the discharge cycle. Flow control valve 536 restricts air flow to the separator pump during the discharge cycle, but allows unrestricted vent air flow from the separator pump at the end of the discharge cycle.

Referring back to FIG. 11, a total fluids auto-pump (closed loop) system 600 is disclosed in which the pump vessel 602 is pressurized and thereby emptied only when the pump vessel is sensed as being full, and further does not blow air into the discharge line, and vented only when the pump vessel is sensed as being empty. Alternatively, the total fluids auto-pump system 600 can be partially closed loop, sensing only when the pump vessel is full, but having a fixed discharge cycle. Preferably, if a pneumatic controller is employed, the controller is located down-well immediately adjacent the pump vessel to reduce pneumatic signal time lags.

Figure 11:
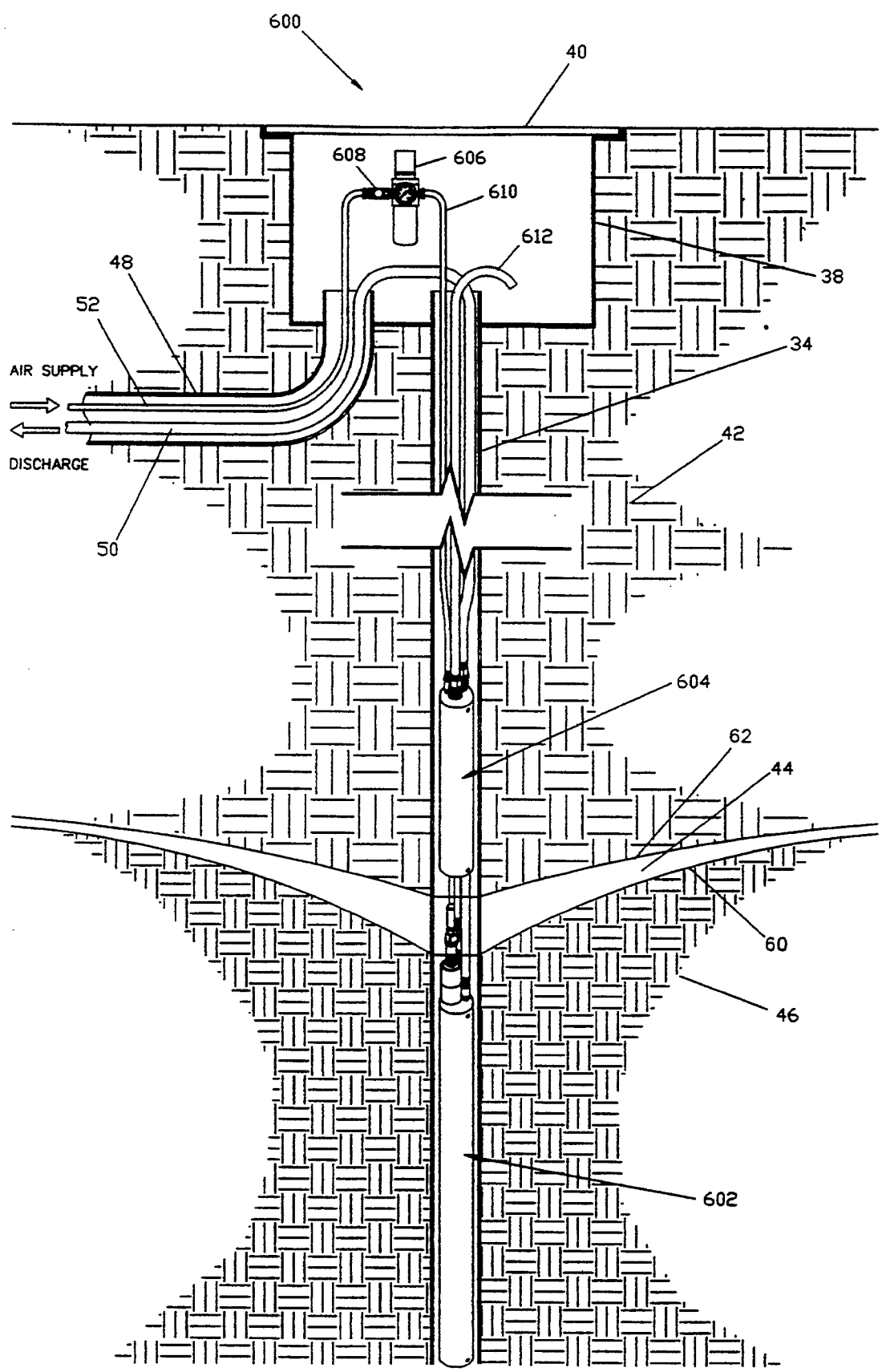
FIG. 11 is a side elevational view of a total fluids auto-pump installed in a remediation well according to a fifth embodiment of the present invention.
Figure 12:
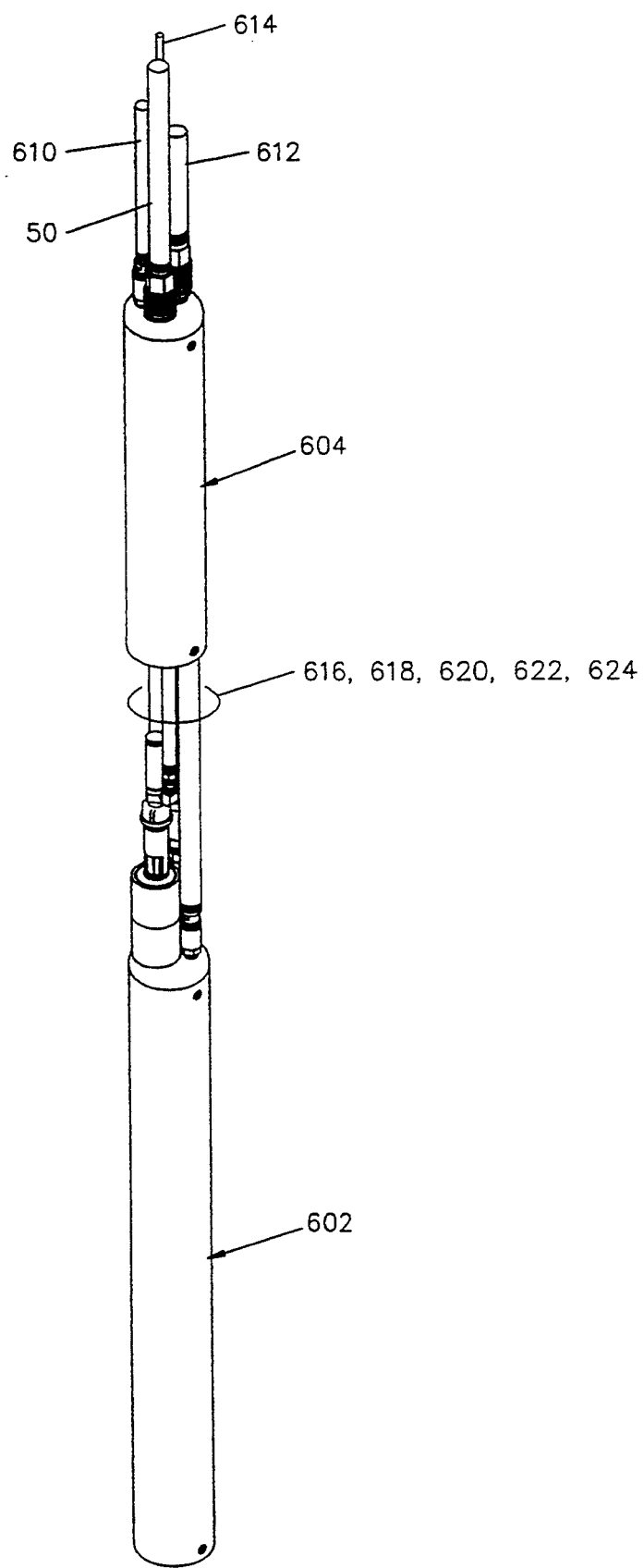
FIG. 12 is a perspective view of the total fluids auto-pump of FIG. 11.

In FIG. 11, total-fluids auto-pumping system 600 is shown installed in a remediation well with compressed air supplied to the system through an air supply hose 52 and pumped liquids expelled under pressure through discharge hose 50. Unlike the total-fluids pumping system 30 shown in FIG. 1, there is no pump controller mounted in the well-head box 38, but rather only a system shut-off valve 608 and a pressure regulator 606. Pump vessel 602 is suspended from control unit 604 by hoses 50, 52 and 612 and a separate cable or rope 614 (FIG. 12). Cable 614 is secured to a winch or other locking device (not shown) at tile top of tile well casing 34. Although shown having a vent hose 612 venting into the well head, venting may also be accomplished out the bottom of control unit 604 directly into the well casing, thereby eliminating vent hose 612 and requiring only air supply hose 610 and discharge hose 50.

In FIG. 12, the total-fluids auto-pump vessel 602 is shown in greater detail connected to control unit 604. Air supply line 610, discharge line 50 and vent line 612 are connected to the top end of control unit 604 via quick connect fittings. Connecting the control unit 604 to pump vessel 602 are support cable 624, discharge line 616, air/vent line 618, sensing line 620 and inlet valve pilot line 622, all of which are fitted at the pump vessel end with quick connect fittings to facilitate installation and servicing.

Figure 13:
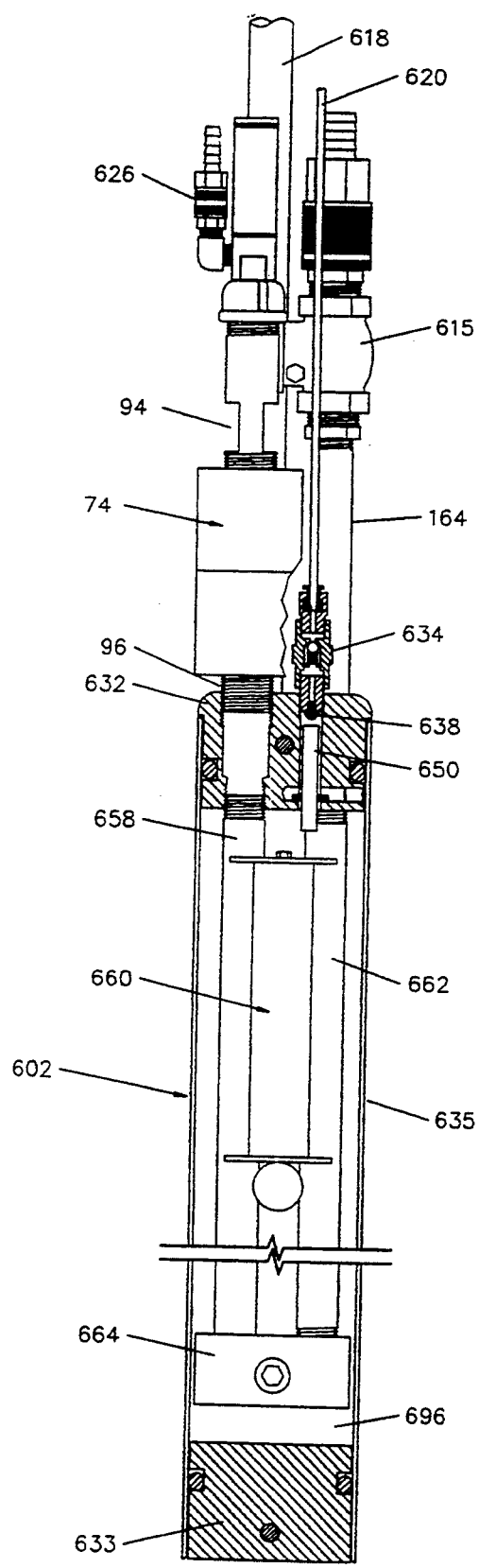
FIG. 13 is a side cross-sectional view of the total fluids auto-pump of FIG. 11.

Referring now also to FIG. 13, inlet valve assembly 74 is identical to that of a total fluids pump, except a quick connect fitting 626 is used at the pilot port. The top and bottom end members 632 and 633 are similarly sealed with O-rings and retained by cylindrical pins and set screws. During the fill cycle, well liquids flow by gravity into the inlet valve 74 through port 94, through vessel end member 632, down inlet drop pipe 658, through port 708 and out port 704 in float seat piece 664 (FIG. 14B) and into chamber 696 of the pump vessel. Fluid flow within the pump vessel communicates through hole 706 in float seat piece 644 (FIG. 14B) and through the annular space between float seat piece 664 and pump vessel 635. Displaced air during the fill cycle is forced out air/vent line 618.

Figure 14A:
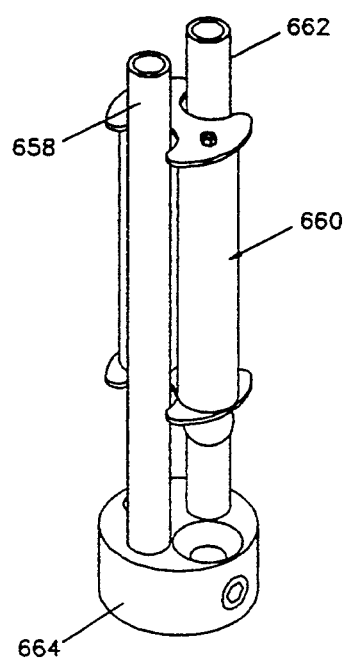
FIG. 14A is a perspective view of a float assembly of the total fluids auto-pump of FIG. 11.
Figure 14B:
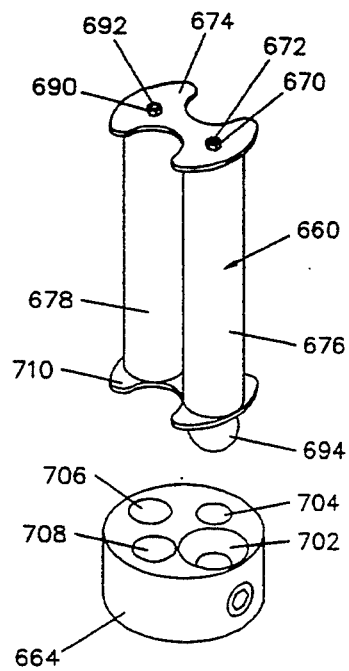
FIG. 14B is an expanded perspective view of a float and float seat of the float assembly of FIG. 14A.
Figure 14C:
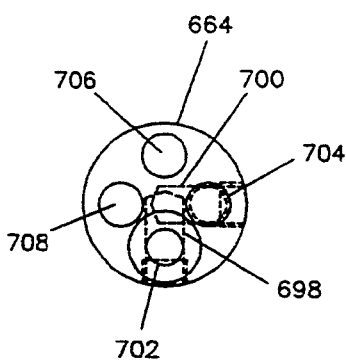
FIG. 14C is bottom plan view of the float seat of FIG. 14C.

Referring now also to FIGS. 14A-14C, disposed within the pump vessel is a float assembly 660 which cooperates with limit switch push rod 650 to sense fluid level in the pump vessel chamber. Float assembly 660 includes symmetric floats 676 and 678, symmetric top and bottom guides 674 and 710 and ball 694. The solid cylindrical floats 676 and 678 are composed of a rigid chemical resistant foam material of sufficient strength to withstand pressures as high as 100 psi. Threaded rods 672 and 692 extend through the components of the float assembly and are secured by nuts 670 and 690. Ball 694, which is composed of a chemical resistant plastic such as teflon, PVC, delrin or nylon, is threaded onto the bottom end of rod 672. As shown in FIG. 14A, float assembly 660 fits between inlet drop pipe 658 and discharge drop pipe 662. Sufficient clearance is provided between the top and bottom float guides and the inlet and discharge drop pipes to allow for free travel of the float assembly should scale deposits accumulate.

As fluid level in the pump vessel rises during the fill cycle, float assembly 660 is buoyed upward until top float guide piece 674 contacts push-rod 650. When push-rod 650 blocks sensing nozzle 638, the control unit automatically commences the discharge cycle. As a result, inlet valve 74 is piloted closed and compressed air is applied to the pump vessel through air/vent line 618, which enters the top of the pump vessel through vessel end member 632. As the pump vessel is pressurized, water is forced into port 702 of float seat 664, through intersecting passages 698 and 700 and out discharge port 704 into discharge pipe 662. Thereafter, fluid is pumped through discharge check valve 615, quick connect fitting 630 and out of the well through discharge line 50.

Pump 602 can also include bottom filling as shown in FIGS. 5 and 6 merely by replacing vessel end member 633 with end member 208 of FIG. 5, for example. Pump 602 is also contemplated as being only bottom filling by removing piloted top inlet valve 74 and plugging the top inlet port. Piloted top inlet valve 74 can also be replaced with a pressure sensitive check valve similar to that of bottom end member 208 for installations having adequate static fluid head above the top of the pump vessel.

Contrary to total-fluids pump 32, inlet drop pipe 658 is not required to prevent ingested free-phase contaminants from floating up intake valve 100 and back into the well in auto-pump 602 because float assembly 660 will initiate the empty cycle before liquid level in the pump can rise above the top of the pump vessel. However, inlet drop pipe 658 is preferred to prevent fluid rushing into the pump vessel from impacting float assembly 660 and possibly delaying sensing of the fluid level in the pump vessel chamber. By incorporating inlet drop pipe 658, the float assembly 660 is free to strike push-rod 650 and initiate the discharge cycle to increase the effective flowrate.

Float assembly 660 and float seat assembly 664 can also be used in total-fluids pump 32 to prevent air from being blown into the discharge line when the predetermined discharge cycle is set too long.

Figure 19:
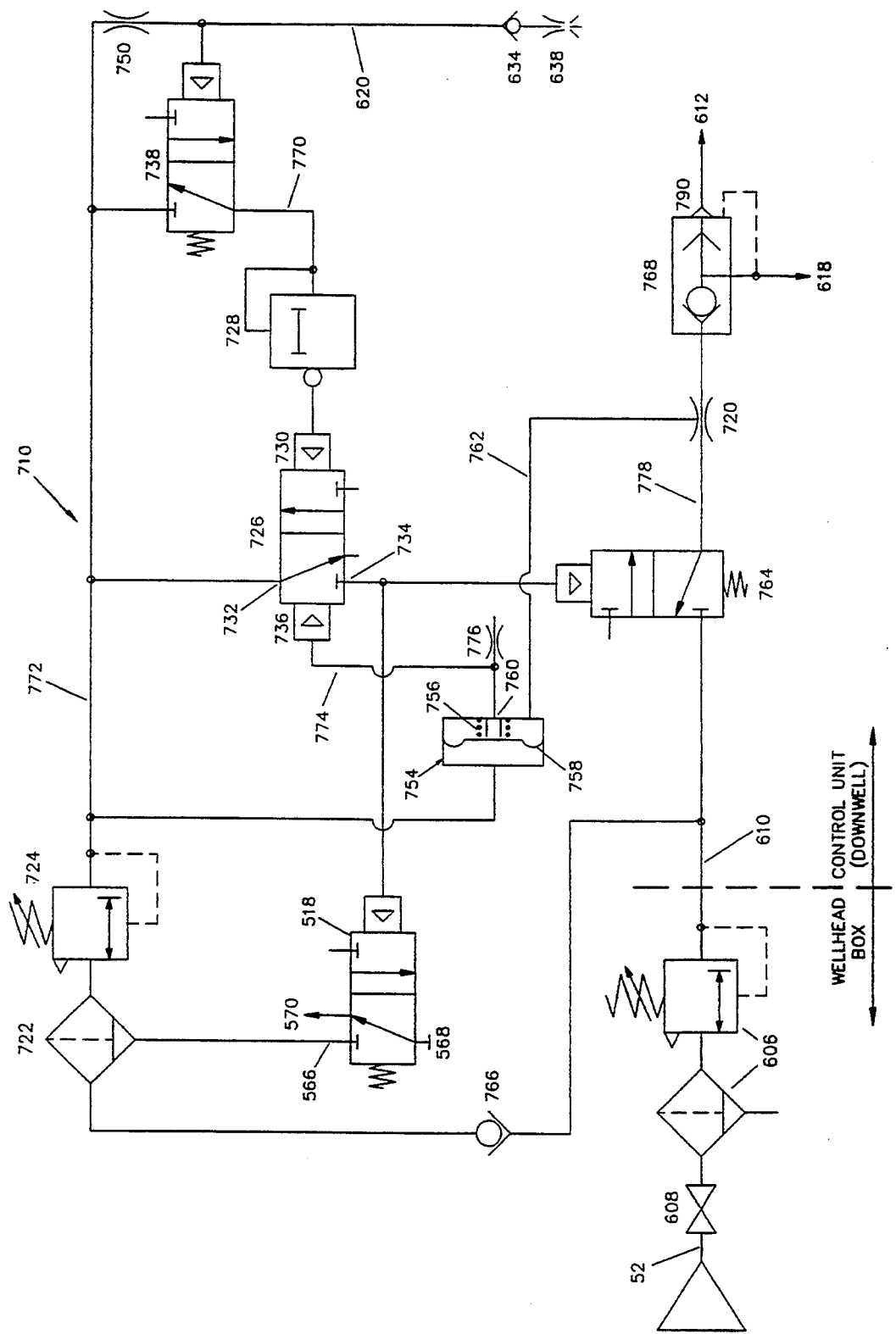
FIG. 19 is a pneumatic circuit diagram of a pneumatic controller for use with total fluids and separator auto-pumps according to a tenth embodiment of the present invention.

Referring now to FIG. 19, a control circuit 710 for the total fluids auto-pump is shown. All of the essential pneumatic circuit components are housed inside control unit 604 (FIG. 12) except as noted below. In FIG. 19, compressed air is supplied to the circuit through line 52 which enters the wellhead box through shut-off valve 608. Regulator 606 determines that air pressure delivered to the pump vessel during the discharge cycle. In the preferred embodiment, regulator 606 is set at 50 psi. or higher to also drive the pneumatic circuit components. Compressed air from regulator 606 is delivered down-well to the control unit through line 610. Inside the control unit, line 610 supplies pressurized air to pump air valve 764 and further to the pump control circuit through one-way check valve 766. Check valve 766 prevents well fluid from entering the control unit when shut-off valve 608 is closed and the control unit is submerged. Control air then passes through filter 722 and regulator 724, which is generally set between 50 and 60 psi. The regulated control air is supplied to pressure comparator 754, valve 726, valve 738 and bleed orifice 750. Downstream of bleed orifice 750, line 620 supplies control air to the pilot port of threeway valve 738 before exiting the bottom of the control unit, through check valve 634, to sensing nozzle 638 (FIG. 13).

When the pump vessel is nearly full and float assembly 660 strikes push rod 650, sensing nozzle 638 is blocked. A flow out bleed nozzle 638 is restricted, pressure in line 620 will increase to the point that piloted three-way valve 738 actuates, thereby permitting line 770 to supply pressurized control air to pulse valve 728. When the inlet of pulse valve 728 is pressurized, a short duration (0.5 sec.) pulse is applied to the pilot 730 of double-piloted three-way valve 726. Piloting port 730 permits control air to flow through inlet port 732 to outlet port 734 and on to pilot air valve 764. The piloting of pump air valve 764 permits compressed air to flow from line 610, through pump air valve 764, through venturi 720, through quick exhaust valve 768 and down to the pump vessel through line 618.

Referring back also to FIGS. 13 and 14, the compressed air entering the pump vessel through line 618 forces fluid flow up discharge line 662. As water level nears the bottom of the pump vessel, ball 694 on the bottom of float assembly 660 seats in port 702 of float seat piece 664. With port 702 blocked, pressure inside the pump vessel and line 618 builds to the pressure setting of regulator 606. Referring back to FIG. 19, prior to port 702 being blocked, diaphragm 758 is held tightly against outlet seat 760 by control pressure in line 772. During the discharge cycle, a vacuum is created in line 762 by venturi 720 to provide additional force to seat diaphragm 758. After ball 694 seats, however, air flow through venturi 720 drops to zero as the pump vessel becomes fully pressurized, and line 762 is pressurized. Aided by spring 756, diaphragm 758 is lifted off outlet seat 760 and air flows into line 774 to actuate the pilot port 736 of valve 726, thereby venting the pilot of pump air valve 764. Pulse valve 728 prevents pressure inside the pump vessel from piloting valve 738. Pressurizing port 736 does not reset valve 726 unless pressure at the port 730 pilot has been removed. With the pilot of pump air valve 764 now vented, lines 778 and 762 are vented through the vent port of pump air valve 764, thereby unloading quick exhaust valve 768 and permitting compressed air in the pump vessel to vent through port 790 and up vent line 612. Orifice 776 allows line 774 to vent completely after line 762 has vented, allowing diaphragm 758 to reseat.

Although regulator 606 can be incorporated into control unit 604, in the preferred embodiment regulator 606 is located in the well head to be accessible for adjustment. While a setting of 50 to 60 psi is sufficient in most cases to push water up discharge line 50, higher settings may be required to overcome pressure that may be present in the discharge header. It is especially desirable to be able to adjust the setting of regulator 606 when several pumps are teed into a common discharge header, as the pumps farthest away from the final discharge point will require higher pressures if equal flow rates from each well are to be maintained.

It is critical that the interior of control unit 604 be isolated from well fluids even when submerged under many feet of water. To accomplish this, all penetrations of the control unit vessel are completely sealed. Air vented from internal pneumatic components are vented out the bottom of the control unit through a bubble-tight check valve. Air vented from the pump vessel can either be discharged through line 612 (FIG. 11) or out the bottom of the control unit.

Referring now to FIGS. 15A and 15B, a separator auto-pump assembly 800 is shown. The separator auto-pump 800 functions similar to separator pump 300 of FIG. 9 except that the fill cycle is initiated by float assembly 802 rising and striking push-rod 804. Float assembly 802 is constructed similar to float assembly 660 except that ball 694 is deleted. Instead of a float seat 664, a spacer 806 is shrink fit around inlet and discharge drop pipes 808 and 810 to maintain spacing of the pipes so that float assembly 802 can move up and down freely. Spacer 806 further provides a limit for downward motion of float assembly 802. Similar to separator pump 300, the discharge cycle of the separator auto-pump is of a fixed time duration. Further, the time duration is factory set and is not readily adjustable. If an adjustable discharge cycle time duration is desirable, the separator pump control can be mounted in a standard enclosure in the well head box, in place of a down-well control unit.

Figure 20:
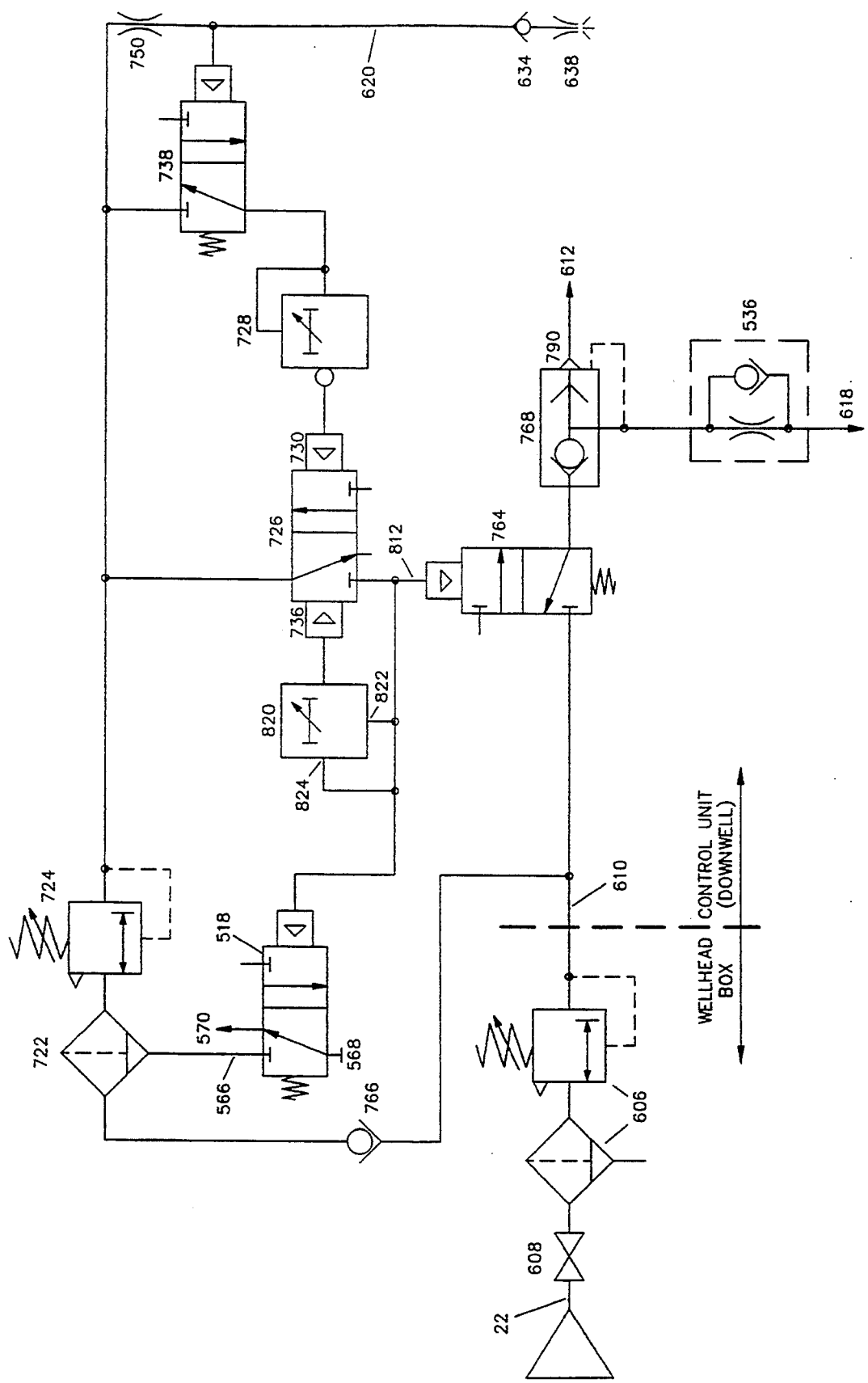
FIG. 20 is a pneumatic circuit diagram of an alternate pneumatic controller for use with total fluids and separator auto-pumps.

Referring now to FIG. 20, the pneumatic control circuit for separator auto-pump 800 is similar to the pneumatic control circuit for separator pump 300. However, the discharge cycle is of a fixed time duration determined by a normally non-passing timer 820. As before, the discharge cycle is initiated by the blocking of sensing nozzle 638. As a result, valve 738 is piloted and valve 728 outputs a pneumatic pulse that is applied to the pilot 730 of double-piloted three-way valve 726, allowing line 812 to be pressurized. The subsequent application of pressure to ports 822 and 824 of timer 820 initiates timing of the discharge cycle. When timer 820 times out, compressed air is allowed to pass through to the pilot 736 of valve 726, thereby venting line 812 and initiating the next fill cycle. Similar to the controller of separator pump 300, the outlet port of quick exhaust valve 768 is connected to a flow control valve 536, which meters air to the separator pump vessel slowly during the 'empty' cycle.

Figure 16:
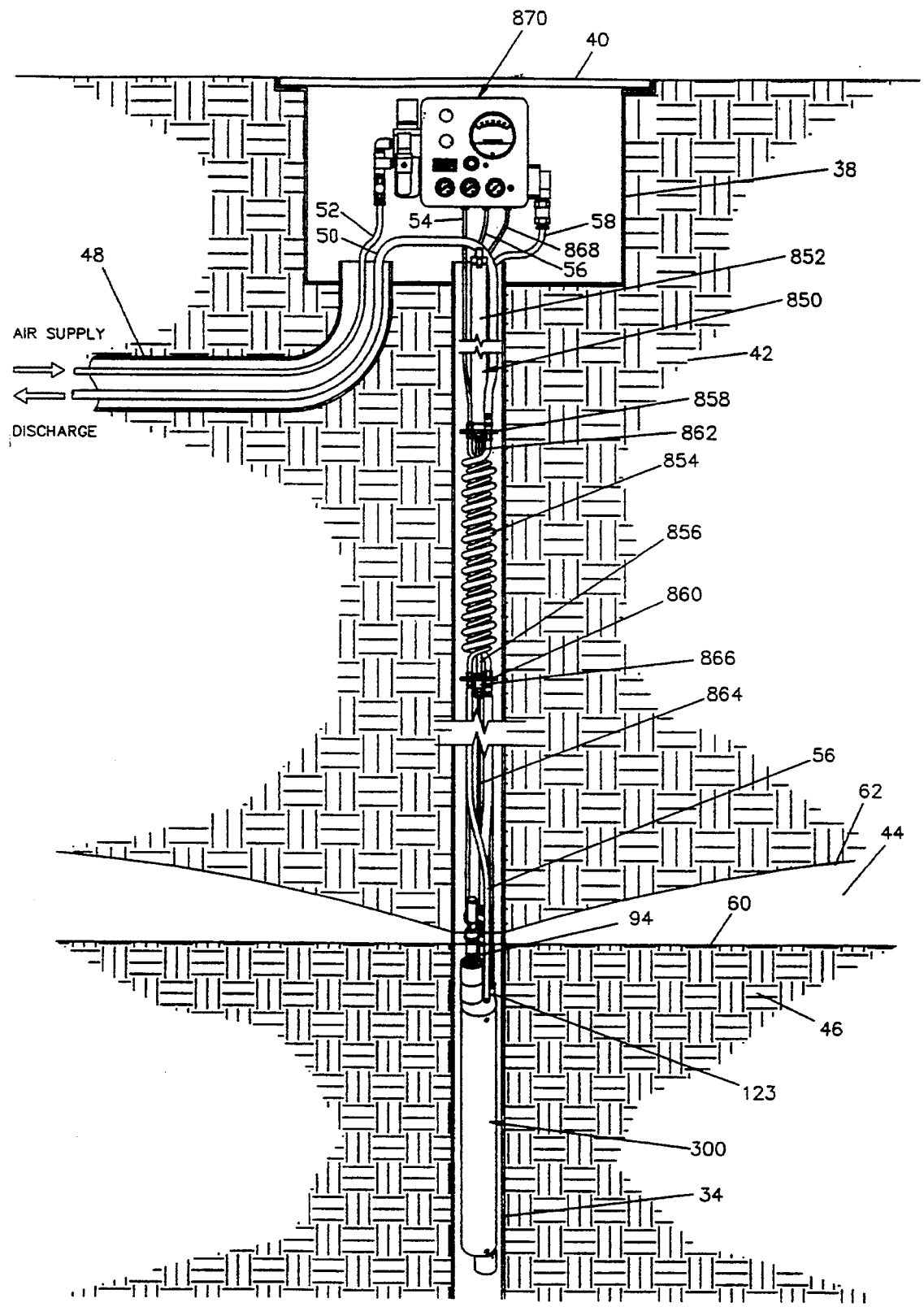
FIG. 16 is side elevational view of a level tracking cylinder connected to the separator pump of FIG. 7 and installed in a remediation well according to a seventh embodiment of the present invention.

Referring now to FIG. 16, a level tracking assembly 850 is shown incorporated with a separator pumping system for example separator pump 300. The purpose of level tracking assembly 850 is to position the separator pump as well level changes over time so that the intake port is disposed just below the water/contaminant interface 60. Level tracking assembly 850 includes a standard pneumatic cylinder 852, coiled tubes 854, extension rod 856 and top and bottom spacers 858 and 860. The four coiled tubes 854, one for each hose going to the pump, compensate for the displacement of the pneumatic cylinder. Top and bottom spacers 858 and 860 center the cylinder 852 and coiled tubes 854 in the well so that contact between the coiled tubes and the well casing is minimized. Bottom spacer 860 is connected to extension rod 856, which is connected to the piston rod of piston/cylinder 852 by coupling nut 862. The top end of piston cylinder 852 is suspended from a winch (not shown) secured to the top of the well casing. The winch is used to make coarse adjustments so that the well level is within the stroke limits of the piston/cylinder 852. The separator pump 300 is suspended by cable 864 which is attached to the end of extension rod 856 by rod clevis 866. The pump 300 is lifted by applying pressure through line 868 to the bottom side of the piston of pneumatic piston cylinder 852. When pressure is relieved from the bottom of the piston in pneumatic piston/cylinder 858, separator pump 56 drops deeper in the well until the cylinder is fully extended. As shown in FIG. 16, pneumatic piston/cylinder 852 is in its fully retracted position.

Figure 21:
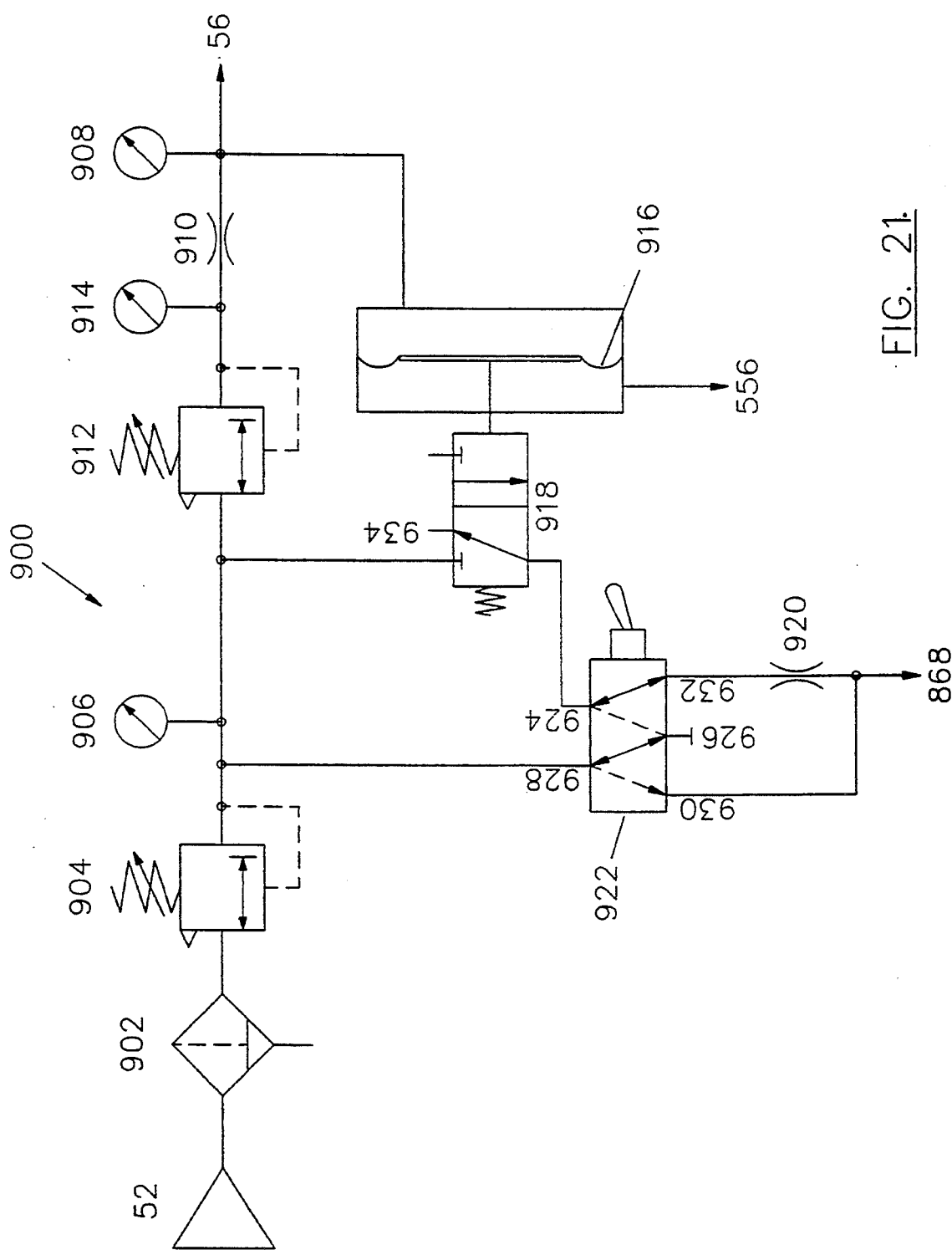
FIG. 21 is a pneumatic circuit diagram of a pneumatic controller for use with level tracking cylinders.

Referring now to FIG. 21, a pneumatic control circuit 900 shown for level tracking assembly 850. All of the pneumatic circuit components are housed in controller 870 (FIG. 16). Control pressure is supplied to circuit 900 through filter 902 and regulator 904. Control pressure is preferably set between 50 and 70 psi and indicated on gauge 906. Similar to the circuit 400 of FIG. 18, the well fluid depth to discharge coupling 123 is transmitted as a pressure signal up line 56 and is indicated on gauge 908. Water is prevented from entering the bottom of line 56 by the trickle of air forced through orifice 910 by pressure supplied by regulator 912 and indicated on gauge 914. The well level signal transmitted through line 56 is also supplied to diaphragm 916 of level control device 918. Although level control device 918 is used to control well level when used in a total fluids pump controller, level control device 918 is instead used in circuit 900 to control the position of the pump relative to the static liquid surface 62 in the well via level tracking assembly 850.

Line 868 is connected to the bottom end of pneumatic cylinder 852. The top end of pneumatic cylinder 852 is vented to atmosphere. Pressure in line 868 is therefore applied to the bottom of the piston in pneumatic cylinder 852, resulting in a lifting force being applied to the pump. In the preferred embodiment, level control ranges between 3 and 5 inches of water column pressure; i.e., when the pressure applied to diaphragm 916 rises above 5 inches of water column, control air is permitted to pass through orifice 920 to pneumatic cylinder 852 via line 868, and when the pressure applied to diaphragm 916 drops below 3" water column, orifice 920 is vented to vent pneumatic cylinder 852 via line 868. If the level control device switches off at 3 inches of water column, coupling 123 is preferably situated approximately 3 inches below inlet port 94 of piloted inlet valve 74.

Toggle switch 922 has two positions, normal and retract. In the retract position, port 924 is connected to port 926 (which is blocked) and port 928 is connected to port 930. In this configuration, unrestricted control air is applied to line 868 and therefore the bottom of the piston in pneumatic cylinder 852. The top end of the pneumatic piston/cylinder is vented into the well. Applying control pressure to line 868 causes the piston rod to fully retract, raising the pump to its highest possible point. The retract position is used when the cylinder assembly and pump are being installed or removed from the well to prevent accidental bending of the cylinder's piston rod.

During installation, with toggle switch 922 in the retract position, the cylinder/pump assembly is slowly lowered into the well by the winch connected to the top of cylinder 852 until the well level reading on gauge 908 begins to rise from zero. The cylinder/pump assembly is then raised by a distance equal to one half of the cylinder's stroke. As such, the cylinder commences operation near the middle of its stroke and is able to compensate for well level fluctuations equal to half the length of the cylinder's stroke in either direction. When toggle switch 922 is in the normal position, port 930 is blocked, port 928 is connected to port 926 which is plugged, and port 924 is connected to port 932, allowing the level tracking sequence to begin. Since the pump inlet (and bubbler coupling 123) is out of the water at this point, level control device 918 is deactuated, allowing compressed air below the piston in piston/cylinder 852 to bleed through orifice 920 and vent through port 934. As air continues to bleed, the weight of the pump eventually overcomes the pressure acting on the bottom of the piston. The piston rod and pump vessel drop slowly and steadily until coupling 123 is five inches deep (the level control device on out), at which point inlet valve ports 94 are two inches below the static fluid surface of the well. At this point, level control device 918 actuates, applying control pressure to orifice 920. The pressure acting on the bottom of the piston steadily increases until the piston rod and pump vessel begin to rise. The pump rises two inches before well level relative to coupling 123 drops below three inches and level control device 918 is deactuated. At this point, inlet valve ports 94 are at the liquid surface in the well. Using this level tracking method, the inlet of the pump constantly oscillates around the static surface of the well and within the stroke of the piston/cylinder.

Figure 17:
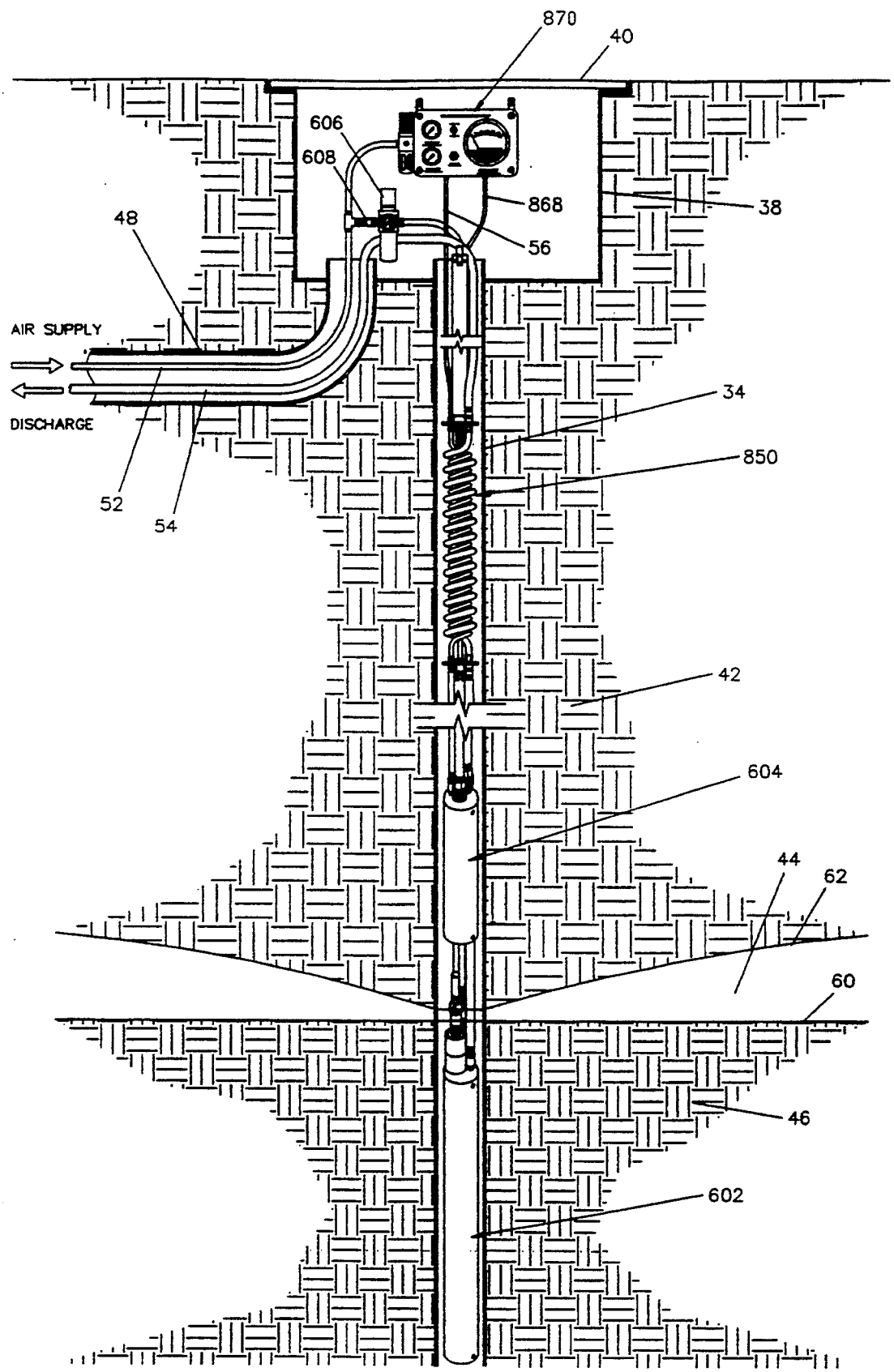
FIG. 17 is a side elevational view of a level tracking cylinder connected to the total fluids auto-pump of FIG. 11 and installed in a remediation well according to an eighth embodiment of the present invention.

This level tracking scheme further has the advantage of having a large force available to lift the pump vessel. For example, if the cylinder's diameter is 1.5 inches and control pressure is set at 60 psi, 90 pounds of lifting force are available. When water table fluctuations greater than a single cylinder's stroke are encountered, two or more level tracking assemblies 850 can be strung together in series. While separator pump 300 has been depicted in FIG. 16, other pumps may also be used; for example, a top filling total fluids 32 such as that shown in FIG. 4. As another example, referring now to FIG. 17, the level tracking cylinder is used in conjunction with a top filling total fluids auto-pump 602 such as that shown in FIG. 11. A separator auto-pump such as that shown in FIG. 7 might also be used. In all cases, a smaller controller 870 houses only the components shown in circuit 900 in FIG. 21.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An underground fluid recovery device for use in a well to pump underground fluids therefrom, said well having a static fluid pressure head relative to said underground fluid recovery device, said underground fluid recovery device comprising:
   a pump housing defining a reservoir therein;
   a power actuated inlet valve connected to said pump housing and fluidly coupled with said reservoir, said power actuated inlet valve being actuated between a closed position preventing flow of underground fluids into said reservoir and an open position permitting flow of underground fluids into said reservoir;
   means, separate from said static fluid pressure head, for actuating said power actuated inlet valve between said open and closed positions;
   discharge valve means, connected to said pump housing and fluidly coupled with said reservoir, for permitting flow of underground fluids from said reservoir;
   means for pressurizing and venting said pump housing to pump underground fluids from said reservoir; and
   means for controlling said means for actuating and said means for pressurizing and venting to actuate said power actuated inlet valve open and to vent said pump housing, thereby defining a fill cycle in which underground fluids are permitted to flow into said reservoir through said power actuated inlet valve, and to actuate said power actuated inlet valve closed and to pressurize said pump housing, thereby defining a pump cycle in which underground fluids are pumped from said reservoir through said discharge valve means.

2. The underground fluid recovery device of claim 1, wherein:
   said power actuated inlet valve includes;
      a valve housing connected to said pump housing and including a first valve chamber fluidly coupled with said reservoir and a second, sealed valve chamber;
      said valve housing further including an inlet between said first and second valve chambers for receiving underground fluids therethrough;
      a valve poppet movably disposed in said first valve chamber, said valve poppet movable between a closed position sealingly engaged against said first valve chamber to prevent flow of underground fluids from said inlet to said reservoir and an open position permitting flow of underground fluids from said inlet to said reservoir;
      a piston movably disposed in said second valve chamber;
      a piston rod connected between said valve poppet and said piston; and
   said means for actuating includes fluid power means for moving said piston in said second valve housing between a first position in which said valve poppet is closed and a second position in which said valve poppet is open.

3. The underground fluid recovery device of claim 2, wherein:
   said means for actuating includes a spring disposed in said second valve chamber and biasing said piston in said second position and means for pressurizing and venting said second valve chamber to bias said piston between said first position and said second position, respectively, said spring biasing said piston in said second position when said second valve chamber is vented; and
   said means for actuating actuates said power actuated inlet valve closed by pressurizing said second valve chamber and actuates said power actuated inlet valve open by venting said second valve chamber.

4. The underground fluid recovery device of claim 3, wherein:
   said means for pressurizing and venting said second valve chamber utilizes air as a working fluid; and
   said valve housing further includes a domed central chamber between said inlet and said second valve chamber, said domed central chamber containing air between said inlet and said second valve chamber to isolate said second valve chamber from underground fluids.

5. The underground fluid recovery device of claim 4, wherein said power actuated inlet valve further comprises means for supplying air to said domed central chamber.

6. The underground fluid recovery device of claim 1, wherein said pump housing includes:
   a top end and a bottom end, said power actuated inlet valve and said discharge valve means being connected to said pump housing at said top end and said reservoir being defined between said top end and said bottom end;
   discharge tube means fluidly coupled with said discharge valve means, said discharge tube means extending down from said top end into said reservoir to a first height above said bottom end; and
   inlet tube means fluidly coupled with said power actuated inlet valve, said inlet tube means extending down from said top end into said reservoir to a second height above said bottom end, said second height being below said first height.

7. The underground fluid recovery device of claim 6, and further comprising inlet valve means, connected to said pump housing at said bottom end and fluidly coupled with said reservoir, for permitting flow of underground fluids into said reservoir.

8. The underground fluid recovery device of claim 7, wherein said inlet tube means includes a flow diverter which reduces impingement of underground fluids against said bottom end of said pump housing.

9. The underground fluid recovery device of claim 8, wherein:
   said inlet valve means is a second power actuated inlet valve actuated between a closed position preventing flow of underground fluids into said reservoir and an open position permitting flow of underground fluids into said reservoir;
   said means for actuating actuates said second power actuated inlet valve between said open and closed positions; and
   said means for controlling controls said means for actuating to actuate said second power actuated inlet valve open during said fill cycle and closed during said pump cycle.

10. The underground fluid recovery device of claim 1, and further comprising means for preventing pressurization of said discharge valve means by said means for pressurizing and venting at the end of said pump cycle.

11. The underground fluid recovery device of claim 10, wherein said means for preventing pressurization of said discharge valve means further comprises:

a float seat disposed in said pump housing, said float seat including a first inlet port fluidly coupled with a first exhaust port, said first inlet port defining a valve seat;

discharge tube means fluidly coupling said discharge valve means with said first exhaust port;

a float having a specific gravity below the specific gravity of the underground fluids and movably disposed in said pump housing according to fluid level in said reservoir;

a valve poppet attached to said float;

wherein said valve poppet of said float engages said valve seat of said float seat at the end of said pump cycle to seal said discharge valve means from pressurization.

12. The underground fluid recovery device of claim 11, wherein:

said float seat includes a second inlet port fluidly coupled with a second exhaust port; and said pump housing includes inlet tube means fluidly coupling said inlet valve means with said second inlet port.

13. The underground fluid recovery device of claim 1, and further comprising:

fluid level sensing means for sensing underground fluid level in said well;

means for adjusting the level of said pump housing in said well in response to said fluid level sensing means; and means for controlling said means for adjusting to adjust the level of said power actuated inlet valve of said pump housing a predetermined distance below the underground fluid level in the well.

14. An underground fluid recovery device for use in a well to pump underground fluids from the well, said underground fluid recovery device collecting water and free-phase contaminants and separating the water from the free-phase contaminants to pump only the free-phase contaminants from the well, said well having a static fluid pressure head relative to said underground fluid recovery device, said underground fluid recovery device comprising:

a pump housing defining a reservoir therein;

a power actuated inlet valve connected to said pump housing and fluidly coupled with said reservoir, said power actuated inlet valve being actuated between a closed position preventing flow of water and free-phase contaminants into said reservoir and an open position permitting flow of water and free-phase contaminants into said reservoir;

means, separate from said static fluid pressure head, for actuating said power actuated inlet valve between said open and closed positions;

first discharge valve means, connected to said pump housing and fluidly coupled with said reservoir, for permitting flow of free-phase contaminants from said reservoir;

second discharge valve means, connected to said pump housing and fluidly coupled with said reservoir, for permitting flow of water from said reservoir;

float valve means, upstream of said second discharge valve means and including a float movably disposed in said reservoir between open and closed positions, for permitting flow of water to said second discharge means in said open position and preventing flow of water to said second discharge means in said closed position;

means for pressurizing and venting said pump housing to pump water and free-phase contaminants from said reservoir; and means for controlling said means for actuating and said means for pressurizing and venting to actuate said power actuated inlet valve open and to vent said pump housing, thereby defining a fill cycle in which water and free-phase contaminants are permitted to flow into said reservoir, and to actuate said power actuated inlet valve closed and to pressurize said pump housing, thereby defining a pump cycle in which water and free-phase contaminants are pumped from said reservoir;

wherein said second discharge valve means is closed during said fill cycle, and wherein said float valve means and said second discharge valve means are open during a first portion of said pump cycle to pump water from said reservoir through said second discharge means and said float valve means is closed during a second portion of said pump cycle to pump free-phase contaminants from said reservoir through said first discharge means.

15. The underground fluid recovery device of claim 14, wherein:

said power actuated inlet valve includes;

a valve housing connected to said pump housing and including a first valve chamber fluidly coupled with said reservoir and a second, sealed valve chamber;

said valve housing further including an inlet between said first and second valve chambers for receiving underground fluids therethrough;

a valve poppet movably disposed in said first valve chamber, said valve poppet movable between a closed position sealingly engaged against said first valve chamber to prevent flow of underground fluids from said inlet to said reservoir and an open position permitting flow of underground fluids from said inlet to said reservoir;

a piston movably disposed in said second valve chamber;

a piston rod connected between said valve poppet and said piston; and said means for actuating includes fluid power means for moving said piston in said second valve housing between a first position in which said valve poppet is closed and a second position in which said valve poppet is open.

16. The underground fluid recovery device of claim 15, wherein:

said means for actuating includes a spring disposed in said second valve chamber and biasing said piston in said second position and means for pressurizing and venting said second valve chamber to bias said piston between said first position and said second position, respectively, said spring biasing said piston in said second position when said second valve chamber is vented; and said means for actuating actuates said power actuated inlet valve closed by pressurizing said second valve chamber and actuates said power actuated inlet valve open by venting said second valve chamber.

17. The underground fluid recovery device of claim 16, wherein:

said means for pressurizing and venting said second valve chamber utilizes air as a working fluid; and said valve housing further includes a domed central chamber between said inlet and said second valve chamber, said domed central chamber containing air between said inlet and said second valve chamber to isolate said second valve chamber from underground fluids.

18. The underground fluid recovery device of claim 17, wherein said power actuated inlet valve further comprises means for supplying air to said domed central chamber.

19. The underground fluid recovery device of claim 14, wherein:
said pump housing includes a top end and a bottom end, said power actuated inlet valve and said first discharge valve means being connected to said pump housing at said top end and said second discharge valve means being connected to said pump body at said bottom end;
said float valve means includes a valve poppet attached to said float and a valve seat disposed in said bottom end, said valve seat being fluidly coupled with said second discharge means; and
said float and valve poppet have a combined specific gravity below the specific gravity of the free-phase contaminants and above the specific gravity of water;
wherein water above a predetermined level in said pump housing floats said float and valve poppet above said valve seat to define said open position for said float valve means and water below said predetermined level sinks said float and valve poppet in said valve seat to define said closed position for said float valve means.

20. The underground fluid recovery device of claim 19, wherein said pump housing includes:
discharge tube means fluidly coupled with said first discharge valve means, said discharge tube means extending from said top end down into said reservoir to a first height above said bottom end; and
inlet tube means fluidly coupled with said power actuated inlet valve, said inlet tube means extending from said top end down into said reservoir to a second height above said bottom end, said second height being below said first height;
wherein said float is movably disposed between said inlet tube means and said bottom end.

21. The underground fluid recovery device of claim 20, wherein said inlet tube means includes a flow diverter which reduces impingement of underground fluids against said float.

22. The underground fluid recovery device of claim 14, and further comprising:
fluid level sensing means for sensing underground fluid level in said well;
means for adjusting the level of said pump housing in said well in response to said fluid level sensing means; and
means for controlling said means for adjusting to adjust the level of said power actuated inlet valve of said pump housing a predetermined distance below the underground fluid level in the well.

23. An underground fluid recovery device for use in a well to pump underground fluids from the well, said underground fluid recovery device comprising:
a pump housing defining a reservoir therein;
inlet valve means, connected to said pump housing and fluidly coupled with said reservoir, for permitting flow of underground fluids into said reservoir;
discharge valve means, connected to said pump housing and fluidly coupled with said reservoir, for permitting flow of underground fluids from said reservoir;
means for pressurizing said pump housing to pump underground fluids from said reservoir;
means for venting said pump housing to permit the flow of underground fluids into said reservoir;
fluid level sensing means, including a float having a specific gravity below the specific gravity of the underground fluids and movably disposed in said pump housing according to fluid level in said reservoir, for sensing fluid level in said reservoir above a first predetermined level; and
means for controlling said means for pressurizing and said means for venting to define a pump cycle in which underground fluids are pumped from said reservoir through said discharge valve means and to define a fill cycle in which underground fluids are permitted to flow into said reservoir through said inlet valve means, said means for controlling pressurizing said pump housing in response to said fluid level sensing means sensing fluid level above said first predetermined level.

24. The underground fluid recovery device of claim 23, wherein:
said fluid level sensing means senses fluid level in said reservoir below a second predetermined level; and
said means for controlling vents said pump housing in response to said fluid level sensing means sensing fluid level below said second predetermined level.

25. The underground fluid recovery device of claim 24, wherein said inlet valve means includes:
a power actuated inlet valve actuated between a closed position preventing flow of underground fluids into said reservoir and an open position permitting flow of underground fluids into said reservoir; and
means for actuating said power actuated inlet valve between said open and closed positions;
wherein said means for controlling controls said means for actuating to actuate said power actuated inlet valve closed during said pump cycle and to actuate said power actuated inlet valve open during said fill cycle.

26. The underground fluid recovery device of claim 25, wherein:
said pump housing includes a top end and a bottom end, said reservoir being defined between said top end and said bottom end;
said float is movable in said reservoir between a first position adjacent to said top end and corresponding to said first predetermined level and a second position adjacent to said bottom end and corresponding to said second predetermined level;
said fluid level sensing means includes first switch means for producing a first signal when said float is in said first position and second switch means for producing a second signal when said float is in said second position; and
said means for controlling controls said means for pressurizing and venting to pressurize said pump housing in response to said first signal and to vent said pump housing in response to said second signal.

27. The underground fluid recovery device of claim 26, wherein:
said power actuated inlet valve and said discharge valve means are connected to said pump housing at said top end;

said pump housing includes a float seat adjacent to said bottom end, said float seat including a first inlet port fluidly coupled with a first exhaust port and said first inlet port defining a valve seat, and discharge tube means fluidly coupling said discharge valve means with said first exhaust port;

said float includes a valve poppet, said valve poppet being unseated from said valve seat in said first position and seated against said valve seat in said second position;

said first switch means is a proximity switch responsive to contact, said float contacting said switch in said first position to produce said first signal; and said second switch means is a pressure switch responsive to pressure above a predetermined pressure in said pump housing, said pump housing being pressurized above said predetermined pressure when said float is in said second position.

28. The underground fluid recovery device of claim 27, wherein:

said float seat includes a second inlet port fluidly coupled with a second exhaust port; and said pump housing includes inlet tube means fluidly coupling said inlet valve means with said second inlet port.

29. The underground fluid recovery device of claim 23, and further comprising:

fluid level sensing means for sensing underground fluid level in said well;

means for adjusting the level of said pump housing in said well in response to said fluid level sensing means; and means for controlling said means for adjusting to adjust the level of said inlet valve means of said pump housing a predetermined distance below the underground fluid level in the well.

30. An underground fluid recovery device for use in a well submerged below the underground fluid level in the well, said underground fluid recovery device pumping underground fluids from the well, said underground fluid recovery device comprising:

a pump housing defining a reservoir therein;

inlet valve means, connected to said pump housing and fluidly coupled with said reservoir, for permitting flow of underground fluids into said reservoir;

discharge valve means, connected to said pump housing and fluidly coupled with said reservoir, for permitting flow of underground fluids from said reservoir;

means for pressurizing and venting said pump housing to pump underground fluids from said reservoir;

fluid level sensing means for sensing underground fluid level in said well; and means for adjusting the level of said pump housing in said well in response to said fluid level sensing means;

means for controlling said means for pressurizing and venting to vent said pump housing, thereby defining a fill cycle in which underground fluids are permitted to flow into said reservoir, and to pressurize said pump housing, thereby defining a pump cycle in which underground fluids are pumped from said reservoir through said discharge valve means; and means for controlling said means for adjusting to adjust the level of said inlet valve means of said pump housing a predetermined distance below the underground fluid level in the well.

* * * * *